(12) United States Patent
Everts et al.

(10) Patent No.: US 12,184,200 B2
(45) Date of Patent: Dec. 31, 2024

(54) ELECTRICAL POWER CONVERTER WITH PRE-CHARGE MODE OF OPERATION

(71) Applicant: PRODRIVE TECHNOLOGIES INNOVATION SERVICES B.V., Son en Breugel (NL)

(72) Inventors: Jordi Everts, Son en Breugel (NL); Noud Slaats, Son en Breugel (NL)

(73) Assignee: PRODRIVE TECHNOLOGIES INNOVATION SERVICES B.V., Son en Breugel (NL)

( * ) Notice: Subject to any disclaimer, the term of this patent is extended or adjusted under 35 U.S.C. 154(b) by 241 days.

(21) Appl. No.: 17/997,728

(22) PCT Filed: May 3, 2021

(86) PCT No.: PCT/EP2021/061590
§ 371 (c)(1),
(2) Date: Nov. 1, 2022

(87) PCT Pub. No.: WO2021/224191
PCT Pub. Date: Nov. 11, 2021

(65) Prior Publication Data
US 2023/0179116 A1 Jun. 8, 2023

(30) Foreign Application Priority Data
May 4, 2020 (NL) ..................................... 2025502

(51) Int. Cl.
*H02M 7/12* (2006.01)
*H02M 1/08* (2006.01)
(Continued)

(52) U.S. Cl.
CPC ............. *H02M 7/219* (2013.01); *H02M 1/08* (2013.01); *H02M 1/322* (2021.05)

(58) Field of Classification Search
CPC ........ H02M 7/219; H02M 1/08; H02M 1/322; H02M 1/4233
See application file for complete search history.

(56) References Cited

U.S. PATENT DOCUMENTS

| 5,784,269 | A | | 7/1998 | Jacobs et al. |
| 5,936,855 | A | * | 8/1999 | Salmon ............... H02M 1/4216 363/51 |

(Continued)

FOREIGN PATENT DOCUMENTS

| EP | 1758233 A2 | 2/2007 |
| WO | 2020035527 A1 | 2/2020 |

OTHER PUBLICATIONS

International Search Report and Written Opinion of the International Searching Authority from the European Patent Office, in PCT/EP2021/061590 dated Jul. 16, 2021, which is an international application corresponding to this U.S. application.

(Continued)

*Primary Examiner* — Jue Zhang
*Assistant Examiner* — Afework S Demisse
(74) *Attorney, Agent, or Firm* — Kolitch Romano Dascenzo Gates LLC

(57) ABSTRACT

An electrical converter includes first and second converter stages, an output filter, and a controller having a first mode for converting a three-phase AC signal into a DC signal. The first converter stage has a three-phase bridge rectifier connecting three phase terminals to an upper intermediate node and a lower intermediate node, and a phase selector having first switches connecting the terminals to a middle intermediate node. The second converter stage includes a switch node connected to the middle intermediate node and a pair of second switches connecting the switch node to one of the DC terminals. In a second mode, the first switches are operated while keeping the upper or lower intermediate node (Continued)

disconnected from all the phase terminals to allow a current to flow between the middle intermediate node and the output filter, allowing for stepwise increasing a voltage across the DC terminals during start-up.

20 Claims, 16 Drawing Sheets

(51) Int. Cl.
*H02M 1/32* (2007.01)
*H02M 7/219* (2006.01)

(56) References Cited

U.S. PATENT DOCUMENTS

| | | |
|---|---|---|
| 6,239,995 B1 * | 5/2001 | Weng .................. H02M 1/4216 363/44 |
| 2016/0149507 A1 | 5/2016 | Lei et al. |
| 2018/0083528 A1 | 3/2018 | Hufnagel et al. |
| 2021/0146782 A1 | 5/2021 | Lehn et al. |

OTHER PUBLICATIONS

Balkowiec, Tomasz, et al.; "Predictive Current-Limiting Thyristor Control in The Modified Thyristor-Equipped Vienna Rectifier," 2018 7th International Conference on Renewable Energy Research and Applications, IEEE, Oct. 14, 2018, pp. 452-457.

Kolar, Johann W., et al.; "The essence of three-phase PFC rectifier systems," Telecommunications Energy Conference, 2011 IEEEE 33rd International IEEE, Oct. 9, 2011, pp. 1-27.

\* cited by examiner

ELECTRICAL POWER CONVERTER WITH PRE-CHARGE MODE OF OPERATION

TECHNICAL FIELD

The present disclosure relates to the field of electrical power conversion. In particular, the present disclosure relates to an electrical converter and a method for controlling the electrical converter.

INTRODUCTION

It is known from U.S. Pat. No. 5,784,269 to add a phase selection switching circuit to a three-phase rectifier for selecting the intermediate phase. The phase selection switching circuit is coupled to a current injection switching circuit of a buck-boost type to reduce harmonics associated with the three phase AC input power. The three-phase rectifier further comprises a boost circuit that increases the DC output voltage beyond the voltage provided by the three phase AC input.

Three-phase rectifiers of the above type find useful application in vehicle battery charging systems and gradient amplifiers of magnetic resonance imaging (MRI) apparatuses with typical output voltage ratings of between about 800-1000 V DC.

One drawback associated with the above rectifier is that the pre-charging, i.e. the stepping up of the output voltage at start-up is not straightforward. It is known to perform pre-charging using a resistive element connected through a relay. However, this solution requires a large volume and causes power losses in the resistive element.

SUMMARY

There is therefore a need in the art to provide an improved three-phase rectifier of the above type. In particular, there is a need to provide a three-phase rectifier enabling a smooth and safe pre-charge (start-up) procedure at limited additional cost.

According to a first aspect of the present disclosure, there is therefore provided an electrical converter for converting an AC signal having three phase voltages into a DC signal, or vice versa.

Electrical converters according to the present disclosure feature a first converter stage. The first converter stage is operable to convert the AC signal at three phase terminals to a first DC signal at an upper intermediate node and a lower intermediate node. The first converter stage can comprise a three-phase bridge converter/rectifier, e.g. comprising or consisting of three bridge legs whose midpoints are respectively connected to each of the three phase terminals (e.g. a three-bridge legs six-switch converter/rectifier). The first converter stage further comprises a phase selector operable to connect the three phase terminals to a middle intermediate node through first active (controllable) switches. The first switches are advantageously active semiconductor switches. The electrical converter further comprises a second converter stage arranged between the first converter stage and the output filter. The second converter stage comprises a switch node and a pair of second switches connecting the switch node to a respective one of the DC terminals. The middle intermediate node is connected to the switch node. The second switches advantageously are configured to form a current injection circuit connecting the middle intermediate node to the DC terminals, e.g. the second switches are operated through pulse width modulation. The current injection circuit is advantageously a buck-boost circuit. The electrical converter advantageously comprises an input filter, advantageously comprising a first inductor configured to filter a current through the middle intermediate node. The first inductor can connect the middle intermediate node to the switch node. An output filter comprising one or more capacitors is connected between the two DC terminals of the electrical converter.

The electrical converter comprises a controller which is configured to operate the electrical converter according to a first mode of operation, referred to as normal operation for converting the three-phase AC signal into the DC signal. During normal operation, the controller operates the first switches of the phase selector such that the phase terminal having an intermediate voltage between the highest voltage and the lowest voltage of the three phase voltages (i.e. having the smallest instantaneous absolute value of the three phase voltages) is connected to the middle intermediate node. Simultaneously, the three-phase bridge rectifier connects the phase terminal having the highest voltage to the upper intermediate node and the phase terminal having the lowest voltage to the lower intermediate node.

According to the present disclosure, the electrical converter is configured to disconnect the upper intermediate node and/or the lower intermediate node from all the phase terminals. This functionality can be obtained through a third switch configured to interrupt an electrical connection between the three-phase bridge converter/rectifier and the upper intermediate node or the lower intermediate node. The third switch is controlled by the controller and is kept closed in the first mode of operation (normal operation) to ensure the phase input having the highest voltage is applied to the upper intermediate node, and/or the phase input having the lowest voltage is applied to the lower intermediate node. Alternatively, the above functionality can be obtained by providing the three phase bridge rectifier with active or controllable switches allowing to (actively or controllably) disconnect the upper intermediate node and/or the lower intermediate node from all the phase terminals.

According to an aspect, the controller is implemented with a second mode of operation. During the second mode of operation, the controller is configured to control switching of the first switches and possibly the second switches so as to apply a phase current between the middle intermediate node and the output filter while keeping the upper or lower intermediate node disconnected from all phase terminals. During the second mode of operation, the first switches are advantageously operated (by the controller) such that the current is directed to charge the output filter capacitor(s).

Hence, in the second mode of operation the upper or lower intermediate node are kept disconnected from all phase terminals to (partially) disable operation of the three-phase bridge rectifier while the phase selector is controlled to allow for intermittently injecting a phase current to the output filter capacitor(s) so as to stepwise charge the capacitor(s) hence increasing the output voltage at the output terminals. The controller is advantageously configured to operate in the second mode of operation at start-up and to switch to the first mode of operation once a desired output voltage is achieved.

When a third switch is used, the third switch is kept open in the second mode of operation. The third switch can be provided as an active semiconductor switch, such as a MOSFET, or as a relay, both of which can be operated by the controller.

During the second mode of operation, the first switches are advantageously operated (by the controller) so as to apply a phase input having a falling/descending voltage higher than a voltage at the upper output terminal to the middle intermediate node. This phase input can be applied from the instant when the falling voltage falls below a predetermined threshold voltage above the instantaneous voltage of the upper output terminal. Alternatively, the first switches are advantageously operated (by the controller) so as to apply a phase input having a rising voltage less than a voltage at the lower output terminal to the middle intermediate node. This phase input can be applied from the instant when the rising voltage reaches a predetermined threshold voltage below the instantaneous voltage of the lower output terminal.

The electrical converter designs according to the present disclosure allow for a controlled pre-charge of the DC bus voltage with minimal added hardware and therefore allows for improved ease of operation and longer service life at minimal cost.

Advantageously, the output stage comprises a boost circuit connected to the upper intermediate node and the lower intermediate node in parallel with the output filter. The boost circuit advantageously comprises an upper boost circuit connected to the upper intermediate node, and a lower boost circuit connected to the lower intermediate voltage node. The upper and lower boost circuits are connected between a common node and an upper and lower output terminal, respectively. The upper and lower boost circuits can each comprise, or consist of, a bridge leg, each comprising an actively switchable semiconductor switch that is advantageously controlled by a pulse width modulation (PWM) control signal to control a current through the circuit, in particular the current through a corresponding inductor of the boost circuit. Therewith, in the first mode of operation, the upper boost circuit controls the current in the phase input with the highest voltage of the three-phase AC input voltage, and the lower boost circuit controls the current in the phase input with the lowest voltage of the three-phase AC input voltage. In addition, the current injection circuit controls the current in the phase input having a voltage between the highest voltage and the lowest voltage.

Advantageously, a current control loop is provided that generates appropriate pulse width modulated (PWM) control signals that control semiconductor switches of both (upper and lower) boost circuits and of the current injection circuit in order to control the current in each inductor or phase input. Advantageously, the pulse width modulated control signals that control semiconductor switches of the boost circuit (upper and lower boost circuit) and of the current injection circuit are interleaved in order to reduce the current stress (and thus potentially also the size) of the output filter capacitors, e.g. minimizing the ripple value and/or the RMS value of the output capacitor currents.

Advantageously, the electrical converter comprises an input filter. The input filter is operably coupled to, and may be considered as forming part of the boost circuit. The input filter advantageously comprises an inductor operably connected to each one of the upper intermediate node, the lower intermediate node and possibly the middle intermediate node.

The inductors can be connected in various ways. In one example, they are connected between the respective intermediate node and the boost circuit. In an alternative example, they are connected between the phase input terminals and the three-phase bridge rectifier.

The input filter can further comprise filter capacitors operably coupled to the inductors. The filter capacitors are advantageously connected between the phase input terminals and the above inductors. When the inductors are connected between the respective intermediate node and the boost circuit, the filter capacitors can be arranged either between the intermediate nodes and the above inductors, or between the phase input terminals and the three-phase bridge rectifier. When the inductors are connected between the phase input terminals and the three-phase bridge rectifier, the filter capacitors are connected between the phase input terminals and the inductors. The filter capacitors advantageously interconnect the upper intermediate node, the middle intermediate node, and the lower intermediate node. In each case, the filter capacitors are advantageously interconnected in a star configuration. When a star configuration is used, a star point is advantageously connected to a common node of the boost circuit, e.g. the node between the upper boost circuit and the lower boost circuit.

The upper boost circuit, the lower boost circuit and/or the current injection circuit advantageously comprise actively switchable semiconductor switches which are controlled through pulse width modulation. The pulse width modulated control signals are advantageously generated by current controllers for each of the upper boost circuit, the lower boost circuit, and the current injection circuit individually during normal operation.

Advantageously, the electrical converter comprises means for measuring one or more of: the three-phase AC input voltage, the inductor currents (of the first and possibly second and third inductors), the phase currents, and the DC output voltage. The measuring means can be coupled to the controller. The controller is advantageously configured to generate (PWM) control signals for the semiconductor switches of the electrical converter (e.g. of the phase selector and/or the boost circuits and/or the current injection circuit) based on these measurements and possibly based on provided set-values.

According to a second aspect of the present disclosure, there is provided a battery charging system, or a magnetic resonance imaging apparatus comprising the electrical converter of the first aspect.

According to a third aspect, there is provided a method of converting a three phase AC input into a DC output as set out in the appended claims. The method is advantageously implemented in the electrical converter as set out above.

An aspect of the present disclosure relates to an electrical converter, that, for example may be used for converting a three-phase AC voltage from an electrical grid, which may be a low voltage (e.g. 380-400 Vrms at 50 Hz frequency) grid, into a high DC output voltage (e.g. 800-1000 V).

BRIEF DESCRIPTION OF THE DRAWINGS

Aspects of the present disclosure will now be described in more detail with reference to the appended drawings, wherein same reference numerals illustrate same features and wherein.

DETAILED DESCRIPTION

Figure 1:
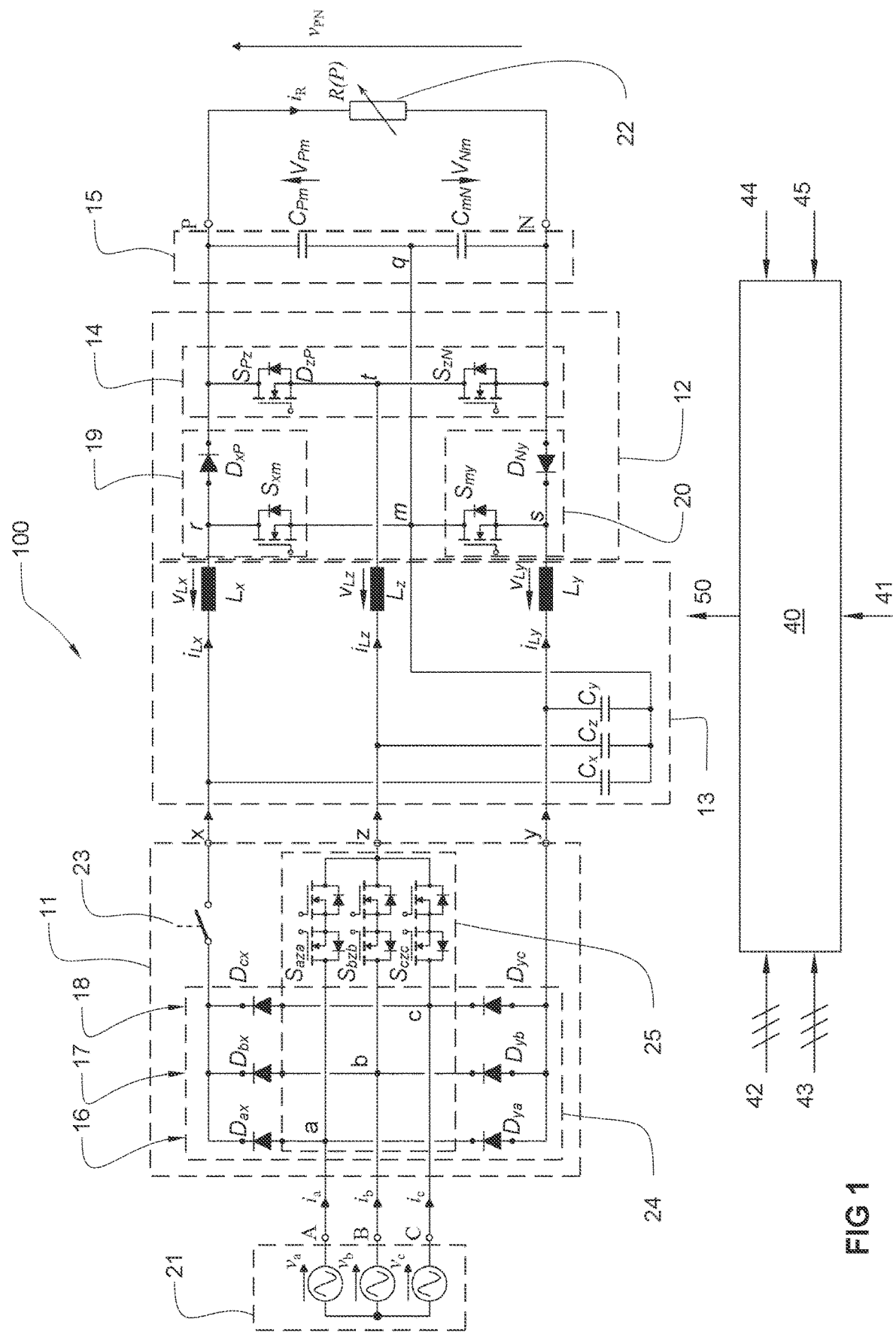
FIG. 1 schematically shows an electrical converter that is unidirectional according to an embodiment of the present disclosure.

FIG. 1 shows an electrical converter 100, referred to as the DUTCH RECTIFIER, comprising an input converter stage 11 and an output converter stage 12. Electrical converter 100 further comprises an input filter 13, and an output filter 15.

The electrical converter 100 is an AC-to-DC converter that has three phase inputs A, B, C which are connected to a three-phase voltage of a three-phase AC grid 21, and two DC outputs P, N which for example may be connected to a DC load 22 such as, for example, a high voltage (e.g. 800 V) battery of an electric car.

The input converter stage 11 comprises three phase connections a, b, c that are connected to the three phase inputs A, B, C, and three outputs x, y, z. These outputs may be seen as an upper intermediate voltage node x, a lower intermediate voltage node y, and a middle intermediate voltage node z.

The input converter stage 11 comprises a three-phase bridge rectifier 24 consisting of three bridge legs 16, 17, 18 wherein each bridge leg comprises two passive semiconductor devices (diodes $D_{ax}$ and $D_{ya}$, for leg 16, $D_{bx}$ and $D_{yb}$ for leg 17, $D_{cx}$ and $D_{yc}$, for leg 18) connected in the form of a half bridge configuration, and a phase selector 25 comprising three selector switches ($S_{aza}$, $S_{bzb}$, and $S_{czc}$) which each comprise two anti-series connected actively switchable semiconductor devices. Each such switchable semiconductor device advantageously has an anti-parallel diode. In this example, Metal Oxide Field Effect Transistors (MOSFETs) are used for the actively switchable semiconductor devices, and each includes an internal anti-parallel body diode that may replace an external anti-parallel diode.

The output converter stage 12 comprises, or consists of, two stacked boost bridge legs 19, 20 and one buck-boost bridge leg 14. Each boost bridge leg (19, 20) comprises a boost switch ($S_{xm}$ for the upper boost bridge leg 19 and $S_{my}$ for the lower boost bridge leg 20) and boost diode ($D_{xP}$ for the upper boost bridge leg 19 and $D_{Ny}$ for the lower boost bridge leg 20) connected in a half-bridge configuration. The buck-boost bridge leg 14 comprises two buck-boost switches ($S_{Pz}$, and $S_{zN}$) connected in a half-bridge configuration. The middle node r of the upper boost bridge leg 19 is connected to intermediate voltage node x via an upper boost inductor $L_x$, the middle node s of the lower boost bridge leg 20 is connected to intermediate voltage node y via a lower boost inductor $L_y$, and the middle node t of the buck-boost bridge leg 14 is connected to intermediate voltage node z via a middle buck-boost inductor $L_z$.

The common node m of the upper and lower boost bridge legs 19, 20 is advantageously connected to the midpoint q of the output filter 15 which comprises two output filter capacitors $C_{Pm}$, $C_{mN}$ that are connected in series between the upper output node P and the lower output node N and midpoint q forming the middle node between capacitors $C_{Pm}$ and $C_{mN}$.

The upper boost bridge leg 19 is connected between the upper output node P and the common node m (i.e. in parallel with the upper output filter capacitor $C_{Pm}$), and is arranged in a way that current can flow from the intermediate voltage node x to the upper output node P via the diode $D_{xP}$, when the switch $S_{xm}$ is open (not conducting, off state), and current can flow from the intermediate voltage node x to the common node m (or vice versa) via the switch $S_{xm}$ when the switch $S_{xm}$ is closed (conducting, on state). The boost switch ($S_{xm}$) of the boost bridge leg 19 is an actively switchable semiconductor device, for example a MOSFET.

The lower boost bridge leg 20 is connected between the common node m and the lower output node N (i.e. in parallel with the lower output filter capacitor $C_{mN}$), and is arranged in a way that current can flow from the lower output node N to the intermediate voltage node y via the diode $D_{Ny}$ when the switch $S_{my}$ is open (not conducting, off state), and current can flow from the common node m to the intermediate voltage node y (or vice versa) via the switch $S_{my}$ when the switch $S_{my}$ is closed (conducting, on state). The boost switch ($S_{my}$) of the boost bridge leg 20 is an actively switchable semiconductor device, for example a MOSFET.

The buck-boost bridge leg 14 is connected between the upper output node P and the lower output node N (i.e. in parallel with the DC load 22) and acts as a current injection circuit arranged such that current flows from the intermediate voltage node z to the upper output node P (or vice versa) when the switch $S_{Pz}$ is closed (conducting, on state) while the switch $S_{zN}$ is open (not conducting, off state), and current flows from the intermediate voltage node z to the lower output node N (or vice versa) when the switch $S_{zN}$ is closed (conducting, on state) while the switch $S_{Pz}$ is open (not conducting, off state). The buck-boost switches ($S_{Pz}$, $S_{zN}$) of the buck-boost bridge leg 14 are actively switchable semiconductor devices, e.g. MOSFETs, which are controlled in a complementary way (i.e. the one is closed while the other is open and vice versa).

Advantageously, three high-frequency (HF) filter capacitors $C_x$, $C_y$, $C_z$, which are part of the input filter 13, are interconnecting the intermediate voltage nodes x, y, z in the form of a star-connection. Generally, it is advantageous that the three capacitors $C_x$, $C_y$, $C_z$ have substantially equal value in order to symmetrically load the AC grid.

According to an aspect of the present disclosure, the electrical converter 100 comprises a switching device 23 connected between the upper nodes of bridge rectifier 24 and the upper intermediate node x. Switching device 23 allows to interrupt the electrical connection between the bridge rectifier 24 and the upper intermediate node x. Switching device 23 is represented in FIG. 1 as a relay switch, but can alternatively be any suitable switching device, such as an active or at least controllable semiconductor switch, e.g. a MOSFET. The switching device 23 is advantageously operably connected to controller 40.

According to an aspect of the present disclosure, the controller is configured to operate according to a first mode of operation, referred to as normal operation, and to a second mode of operation, referred to as start-up operation as will be further described herein.

The central control unit 40 advantageously controls all the controllable semiconductor devices (switches) of the electrical converter 100, sending control signals to each switch via a communication interface 50. In particular, semiconductor devices $S_{aza}$, $S_{bzb}$, $S_{czc}$, $S_{xm}$, $S_{my}$, $S_{Pz}$, $S_{zN}$ are controlled by controller 40. Furthermore, the control unit has measurement input ports (42, 43, 44, 45), for receiving measurements of:

42: the AC-grid phase voltages $v_a$, $v_b$, $v_c$;

43: the inductor currents $i_{Lx}$, $i_{Ly}$, $i_{Lz}$;

44: the DC bus voltage $V_{pN}$;

45: the DC bus mid-point voltage $V_{mN}=-V_{Nm}$, and an input port 41 to receive a set-value, which may be a requested DC output voltage $V^*_{PN}$. Controller operation allows particularly to accomplish the piece-wise sinusoidal shapes of inductor currents $i_{Lx}$, $i_{Ly}$, $i_{Lz}$ during normal operation.

Figure 5:
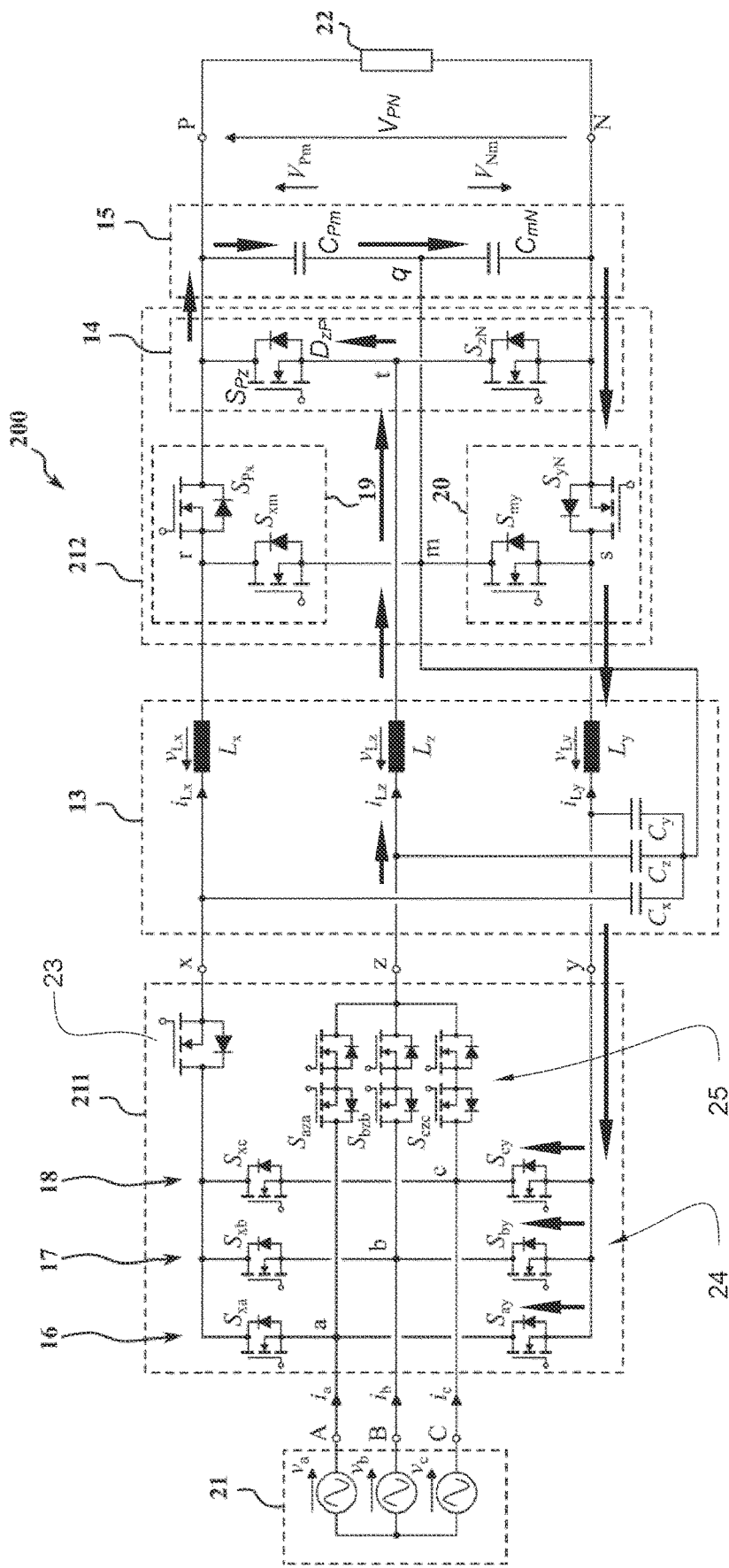
FIG. 5 schematically shows an electrical converter that is bidirectional according to an embodiment of the present disclosure.

The electrical converter 100 shown in FIG. 1 is unidirectional since the input stage 11 and the output converter stage 12 contain diodes, only allowing power to be drawn from the electrical AC grid 21 and provide this power at the output to a load 22. FIG. 5, on the other hand, shows an electrical converter 200 according to the present disclosure that is bidirectional. Electrical converter 200 differs from converter 100 in that the diodes ($D_{ax}$, $D_{bx}$, $D_{cx}$, $D_{ya}$, $D_{yb}$, $D_{yc}$) of the input stage 11 and the diodes ($D_{xP}$, $D_{Ny}$) of the output converter stage 12 of the converter shown in FIG. 1 have been replaced with controllable semiconductor switches ($S_{xa}$, $S_{xb}$, $S_{xc}$, $S_{ay}$, $S_{by}$, $S_{cy}$) in the input stage 211 and ($S_{yN}$, $S_{Px}$) in the output converter stage 212 respectively. The switching device 23 is provided as a semiconductor switch, e.g. MOSFET.

Normal Operation of the Electrical Converter

During normal operation, the switching device 23 is kept closed (conducting state) to apply the phase input having highest voltage by the bridge rectifier 24 to the upper intermediate node x.

Referring again to FIG. 1, the bridge leg of bridge rectifier 24 that is connected with the phase input A, B, or C that has the highest voltage of the three-phase AC input voltage is switched in a way that the corresponding phase input A, B, or C is connected to the upper intermediate voltage node x. To achieve this, the bridge leg connects the corresponding phase connection a, b, or c with the node x via the upper diode ($D_{ax}$, $D_{bx}$, $D_{cx}$) of the bridge leg, while the corresponding selector switch ($S_{aza}$, $S_{bzb}$, $S_{czc}$) of the bridge leg is open (not conducting, off state). The bridge leg of the rectifier 24 that is connected with the phase input A, B, or C that has the lowest voltage of the three-phase AC input voltage is switched in a way that the corresponding phase input A, B, or C is connected to the lower intermediate voltage node y. To achieve this, the bridge leg connects the corresponding phase connection a, b, or c with the node y via the lower diode ($D_{ya}$, $D_{yb}$, $D_{yc}$) of the bridge leg, while the corresponding selector switch ($S_{aza}$, $S_{bzb}$, $S_{czc}$) of the bridge leg is open (not conducting, off state). The phase input A, B, or C that has a voltage between the highest voltage and the lowest voltage of the three-phase AC input voltage is connected by phase selector 25 to the middle intermediate voltage node z. To achieve this, the phase selector 25 connects the corresponding phase connection a, b, or c with the node z via the selector switch ($S_{aza}$, $S_{bzb}$, $S_{czc}$) which is closed (conducting, on state).

Figure 2A:
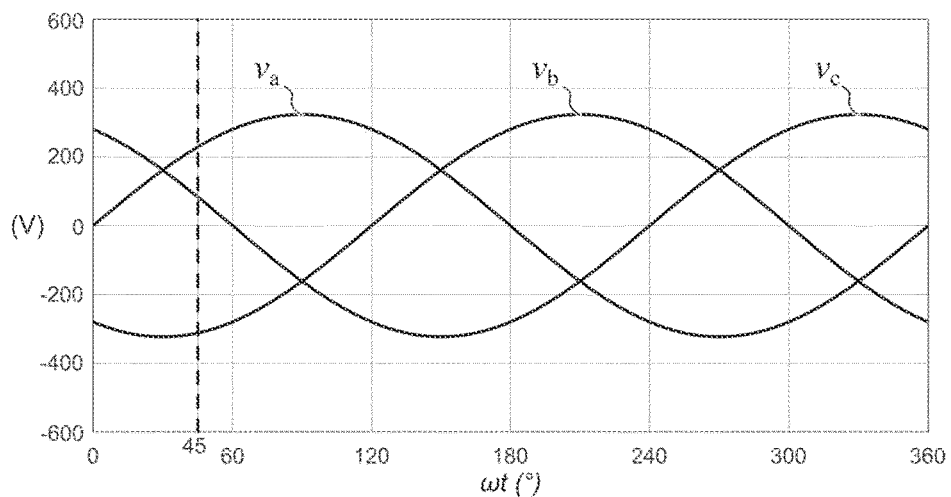
FIGS. 2A-C show diagrams with voltages of respectively AC phase inputs, intermediate nodes, and input filter capacitors.
Figure 2B:
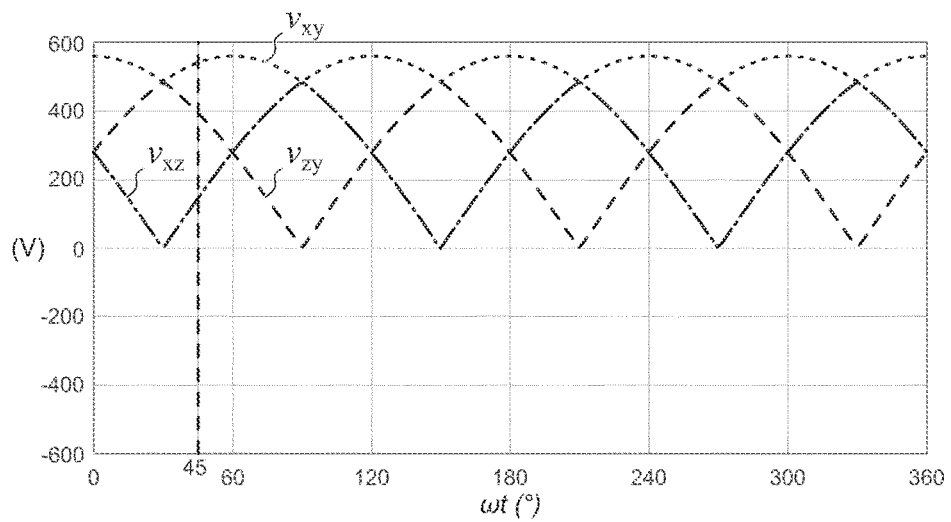
Figure 2C:
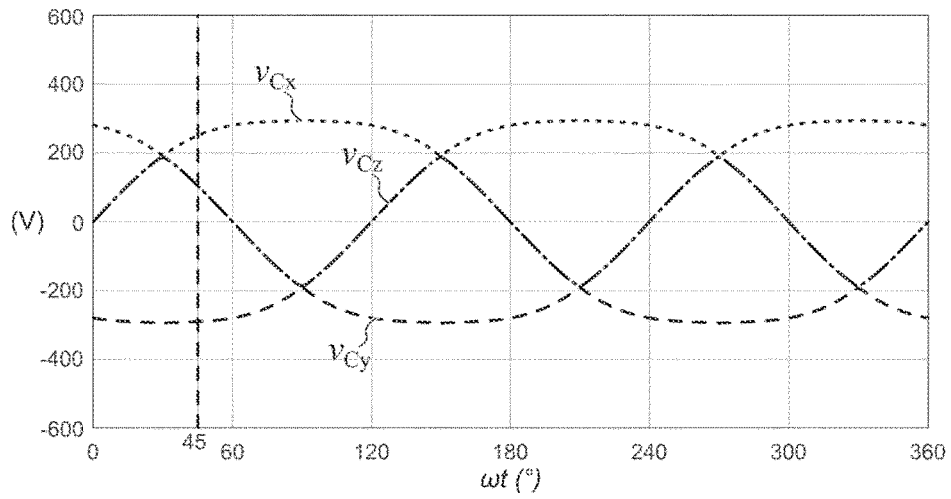

In a three-phase AC grid with substantially balanced phase voltages, for example as shown in FIG. 2A, the three-phase AC input voltage (shown in FIG. 2A) is converted into three intermediate DC voltages ($v_{xz}$, $v_{zy}$, $v_{xy}$; shown in FIG. 2B) provided between the upper intermediate voltage node x, the lower intermediate voltage node y and the middle intermediate voltage node z. These DC voltages thus show piece-wise sinusoidal shapes. The conversion of the three-phase AC input voltage into three intermediate DC voltages is the result of the operation of the input stage 11, as explained above. The switching states (switch on→S=1, switch off→S=0) of the selector switches ($S_{aza}$, $S_{bzb}$, $S_{czc}$) are shown in FIG. 2F. It can be seen that the switches are 'on' or 'off' continuously during whole particular 60° sectors within the period (360°) of the AC mains voltage. Also the diodes of the bridge rectifier 24 are 'conducting' or 'not conducting' during whole particular sectors, e.g. of 60°, within the period (360°) of the AC mains voltage. The combination of states of the switches and diodes is unique for every 60° sector of the three-phase AC input voltage and depends on the voltage value of the phase inputs (A, B, C). The sequence of the 6 unique states of the switches and diodes repeats itself every period (360°) of the AC mains voltage.

Seen from the viewpoint of the intermediate voltage nodes x, y, z towards the output terminals P, N, a conventional DC-DC boost circuit (upper boost circuit) is formed, comprising the HF filter capacitor $C_x$, the upper boost inductor $L_x$, the upper boost bridge leg 19, and the upper output capacitor $C_{Pm}$. The input voltage of this upper boost circuit is the voltage $v_{Cx}$ (shown in FIG. 2C) across capacitor $C_x$, and the output voltage of this upper boost circuit is the voltage $V_{Pm}$ across the upper output capacitor $C_{Pm}$, having a voltage value that is substantially equal to half the total DC bus voltage ($V_{Pm} \approx V_{PN}/2$). The formed upper boost circuit may be operated by PWM modulation of the switch $S_{xm}$ at a specified, possibly variable, switching frequency $f_s$ in order to control the current in the upper boost inductor $L_x$.

Seen from the viewpoint of the intermediate voltage nodes x, y, z towards the output terminals P, N, a conventional 'inversed' (negative input voltage and negative output voltage) DC-DC boost circuit (lower boost circuit) is formed, comprising the HF filter capacitor $C_y$, the lower boost inductor $L_y$, the lower boost bridge leg 20, and the lower output capacitor $C_{mN}$. The input voltage of this lower boost circuit is the voltage $v_{Cy}$ (shown in FIG. 2C) across capacitor $C_y$ and the output voltage of this lower boost circuit is the voltage $V_{Nm}$ across the lower output capacitor $C_{mN}$, having a voltage value that is substantially equal to minus half the total DC bus voltage ($V_{Nm} \approx -V_{PN}/2$). The formed lower boost circuit may be operated by PWM modulation of the switch $S_{my}$ at a specified, possibly variable, switching frequency $f_s$ in order to control the current in the lower boost inductor $L_y$.

Seen from the viewpoint of the intermediate voltage nodes x, y, z towards the output terminals P, N, a conventional DC-DC buck-boost circuit (middle buck-boost circuit) is formed, comprising the HF filter capacitor $C_z$, the middle buck-boost inductor $L_z$, the buck-boost bridge leg 14, and the series connection of the output capacitors $C_{Pm}$, $C_{mN}$. This DC-DC buck-boost circuit may be seen as to be similar to a single-phase half-bridge voltage-source converter (VSC). The input voltage of this middle buck-boost circuit is the voltage $v_{Cz}$ (shown in FIG. 2C) across capacitor $C_z$ and the output voltage of this middle buck-boost circuit is the output voltage $V_{PN}$ across the series connection of the output capacitors $C_{Pm}$, $C_{mN}$. The formed middle buck-boost circuit may be operated by PWM modulation of the switches $S_{Pz}$, $S_{zN}$ at a specified, possibly variable, switching frequency $f_s$ in order to control the current in the middle buck-boost inductor $L_z$.

Figure 2D:
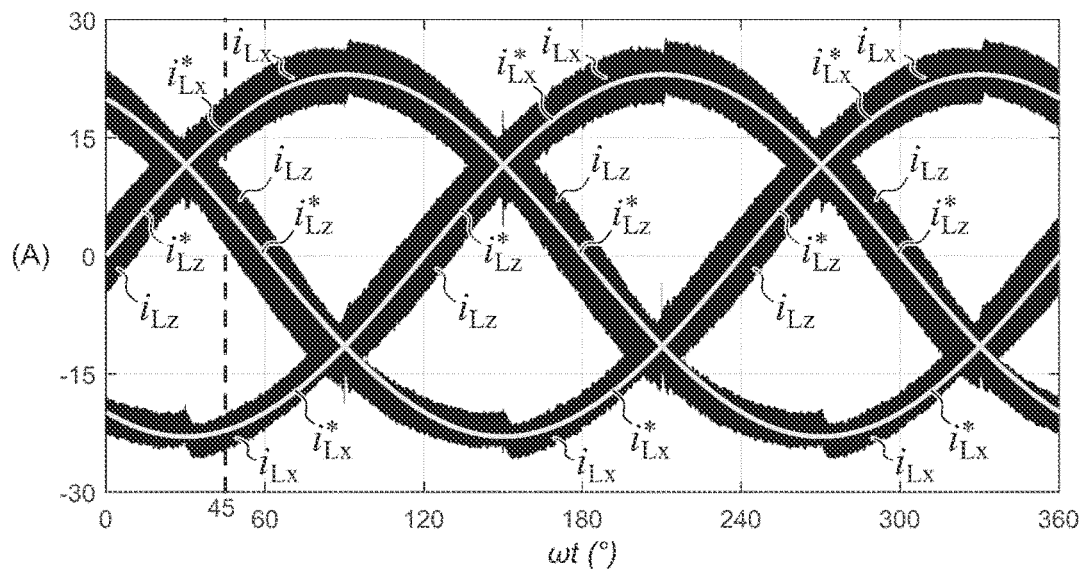
FIG. 2D shows a diagram of currents of the input filter inductors.
Figure 2E:
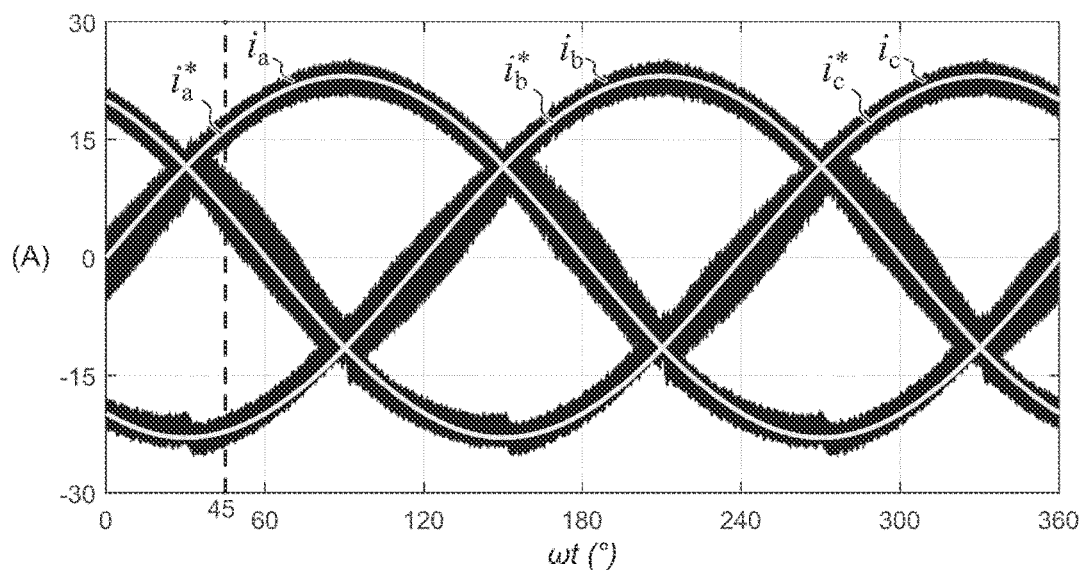
FIG. 2E shows a diagram of the phase currents.
Figure 2F:
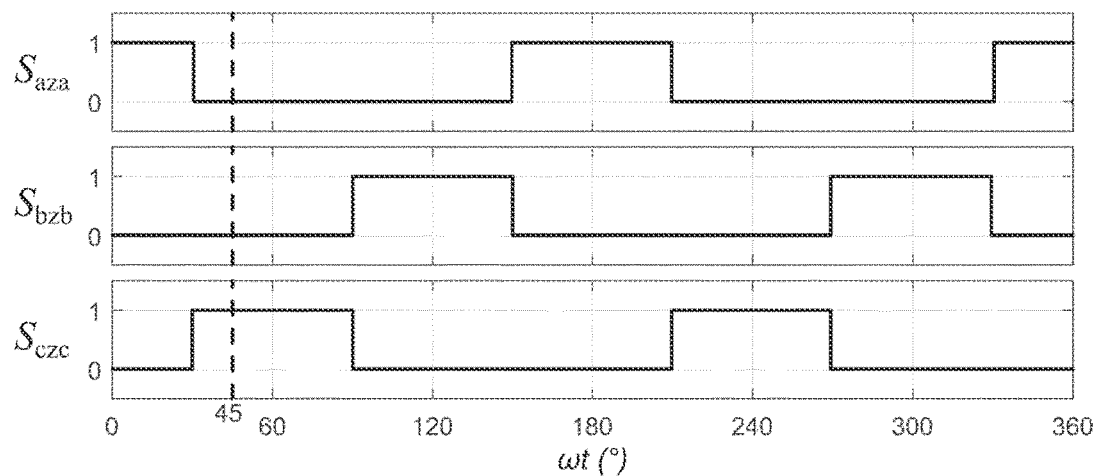
FIG. 2F shows a diagram of switching states of the phase-selector switches during normal operation (first mode of operation) wherein a value 0 corresponds to an off or open state and a value 1 corresponds to an on or closed state.
Figure 2G:
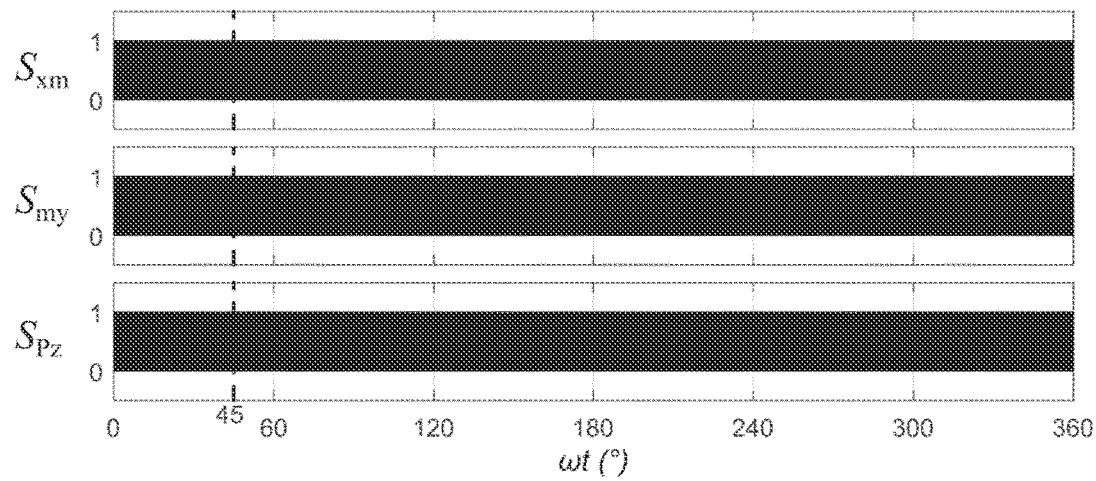
FIG. 2G shows a diagram of switching states of the switches of the boost (upper and lower) and buck-boost circuits during a 360° period of the AC mains voltage, and illustrates the overall operating principle of the electrical converter according to an embodiment of the present disclosure.

FIG. 2G shows the state of the switch $S_{xm}$ of the upper boost bridge leg 19, the state of the switch $S_{my}$ of the lower boost bridge leg 20, and the state of the switch $S_{Pz}$ (note that the state of the switch $S_{zN}$ is the complement of the state of the switch $S_{Pz}$) of the middle buck-boost bridge leg 14. The switches $S_{xm}$, $S_{my}$, $S_{Pz}$, $S_{zN}$ are all PWM modulated as can be seen from the black-colored bars, indicating PWM modulation of the corresponding switch.

An example of the currents $i_{Lx}$, $i_{Ly}$, $i_{Lz}$ in the inductors $L_x$, $L_y$, $L_z$ is shown in FIG. 2D. As can be seen, these currents are controlled to have piece-wise sinusoidal shapes and are transformed, i.e., as a result of the operation of the input stage 11, into three sinusoidal AC phase currents $i_a$, $i_b$, $i_C$ which are shown in FIG. 2E.

Figure 3:
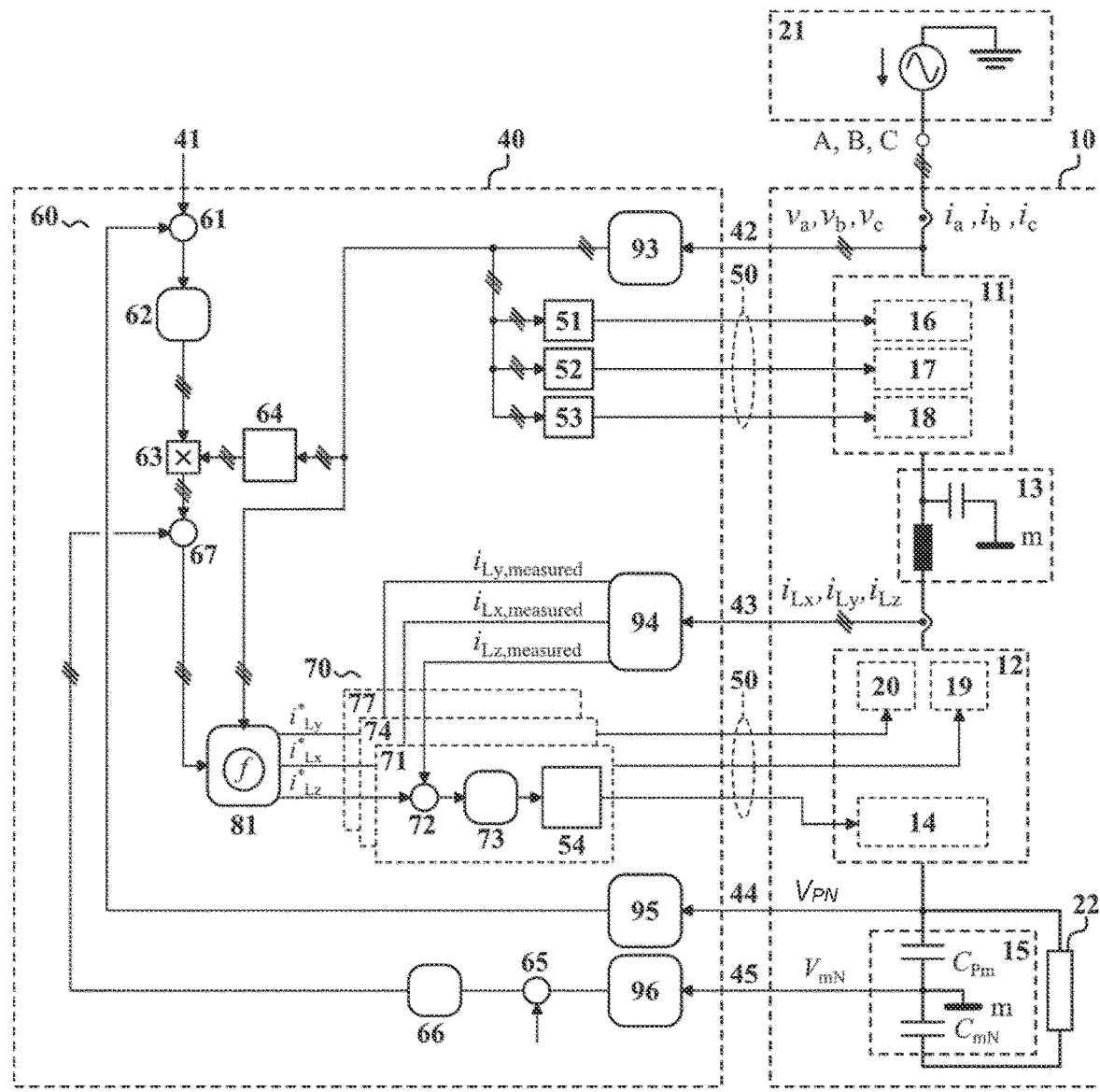
FIG. 3 shows a block diagram of an advantageous implementation of a central control unit and control method for a first mode of operation of the electrical converter as described herein.

FIG. 3 shows a block diagram of an advantageous implementation of the central control unit 40 of FIG. 1 during the first mode of operation referred to as normal operation. The electrical converter 100 is represented in FIG. 3 as a 'single-wire' equivalent circuit, wherein the annotations of the elements correspond with those given in FIG. 1. Three slashes in a signal line indicate the bundling of three phase signals, and may represent the transition to a vector representation.

The goal of the control unit 40 is to control the output voltage $V_{PN}$ to a requested set-value $V^*_{PN}$ that is received from an external unit via input port 41, and to balance the voltage across the two output capacitors $C_{Pm}$ and $C_{mN}$, for example by controlling the voltage across the lower output capacitor $C_{mN}$ to be substantially equal to half the DC bus voltage. Additionally, the current drawn from the phase inputs (a,b,c) needs to be shaped substantially sinusoidal and controlled substantially in phase with the corresponding phase voltage. As explained previously, this can also be achieved by controlling the inductor currents $i_{Lx}$, $i_{Ly}$, $i_{Lz}$, i.e., instead of directly controlling the phase currents $i_a$, $i_b$, $i_c$, to have piece-wise sinusoidal shapes. In particular, the low-pass filtered values of the inductor currents are controlled while the high-frequency ripple of the inductor currents is filtered by the HF filter capacitors ($C_x$, $C_y$, $C_z$).

The control of the output voltage $V_{PN}$ is advantageously done using a cascaded control structure, comprising an outer voltage control loop 60 and inner current control loop 70. The set-value of the output voltage is input to a comparator 61 via input port 41, and is compared with the measured output voltage obtained from a measurement processing unit 95 (for example comprising a low-pass filter). The output of comparator 61 is the control-error signal of the output voltage, which is further input to a control element 62 (for example comprising a proportional-integral control block) that outputs the instantaneous set-values of the amplitudes of the phase currents. These amplitudes are input to multiplier 63, and multiplied with signals that are obtained from calculation element 64 that outputs normalized instantaneous values of the phase voltages. The input of calculation element 64 are the measured phase voltages obtained from a measurement processing unit 93 (for example comprising a low-pass filter). The output of the multiplier 63 are set-values $i^*_a$, $i^*_b$, $i^*_c$ for the instantaneous, for example low-pass filtered, phase currents $i_a$, $i_b$, $i_c$, and are shaped substantially sinusoidal and positioned substantially in phase with the corresponding phase voltages. The set-values $i^*_a$, $i^*_b$, $i^*_c$ are input to the current controller 70 after passing an addition element 67 and a selection element 81 whose functions are further detailed in the following text.

The current controller 70 is split into three individual current controllers 71, 74, 77, wherein:

individual current controller 71 is used for controlling the current in the middle buck-boost inductor $L_z$. This control is done by PWM modulation of the switches $S_{Pz}$, $S_{zN}$ of the middle buck-boost circuit containing middle buck-boost bridge leg 14. As a result of the operation of the input stage 11, therewith, controller 71 controls the current of the phase input A,B,C, that has a voltage between the highest voltage and the lowest voltage of the three-phase AC voltage;

individual current controller 74 is used for controlling the current in the upper boost inductor $L_x$. This control is done by PWM modulation of the switch $S_{xm}$ of the upper boost circuit containing upper boost bridge leg 19. As a result of the operation of the input stage 11, therewith, controller 74 controls the current of the phase input A,B,C, that has the highest voltage of the three-phase AC voltage;

individual current controller 77 is used for controlling the current in the lower boost inductor $L_y$. This control is done by PWM modulation of the switch $S_{my}$ of the lower boost circuit containing lower boost bridge leg 20. As a result of the operation of the input stage 11, therewith, controller 77 controls the current of the phase input A,B,C, that has the lowest voltage of the three-phase AC voltage.

Selector element 81 is used to send the set-values $i^*_a$, $i^*_b$, $i^*_c$ (shown in FIG. 2D) for the instantaneous phase currents to the correct individual current controller (71, 74, 77) depending on the voltage value of the phase inputs (A, B, C), resulting in inductor current set-values $i^*_{Lx}$, $i^*_{Ly}$, $i^*_{Lz}$ (shown in FIG. 2E) for each inductor current controller, wherein:

the set-value of the phase current of the phase input A,B,C, that has the highest voltage of the three-phase AC voltage is sent to individual current controller 74, resulting in set-value $i^*_{Lx}$;

the set-value of the phase current of the phase input A,B,C, that has the lowest voltage of the three-phase AC voltage is sent to individual current controller 77, resulting in set-value $i^*_{Ly}$;

the set-value of the phase current of the phase input A,B,C, that a voltage between the highest voltage and the lowest voltage of the three-phase AC voltage is sent to individual current controller 71, resulting in set-value $i^*_{Lz}$.

In each individual current controller the received set-value ($i^*_{Lx}$, $i^*_{Ly}$, $i^*_{Lz}$) for the instantaneous inductor current is input to a comparator, for example comparator 72 of individual current controller 71, and compared with the measured inductor current obtained from a measurement processing unit 94 (for example comprising a low-pass filter). The output of the comparator is the control-error signal of the current, which is further input to a control element, for example control element 73 of individual current controller 71, whose output is input to a PWM generation element, for example PWM generation element 54 of individual current controller 71. The PWM generation element of the individual current controllers generate the PWM-modulated control signals for the controllable semiconductor switches of the PWM-controlled bridge legs, i.e. the upper boost bridge leg 19 of the upper boost circuit, the lower boost bridge leg 20 of the lower boost circuit, and the middle buck-boost bridge leg 14 of the middle buck-boost circuit. These PWM-modulated control signals are sent to the appropriate bridge legs via communication interface 50.

The selector switches of the input stage 11 are either 'on' or 'off' during each 60° sector of the three-phase AC input voltage, depending on the voltage value of the phase inputs (A, B, C). The control signals for the selector switches are generated by switch-signal generators 51, 52, 53.

DC bus mid-point balancing can be done by adding an offset value to the set-values $i^*_a$, $i^*_b$, $i^*_c$ for the instantaneous, for example low-pass filtered, phase currents $i_a$, $i_b$, $i_c$, which are output by multiplier 63. The offset value is obtained by comparing the measured DC bus midpoint voltage obtained from a measurement processing unit 96 (for example comprising a low-pass filter) with a set-value (for example $V_{PN}/2$) using comparator 65 and feeding the error signal output by the comparator 65 into a control element 66.

The phase currents $i_a$, $i_b$, $i_c$ shown in FIG. 2E are obtained by controlling the electrical converter 100 using such control unit 40 and control method detailed in the foregoing text. Also shown in FIG. 2E are the set-values $i^*_a$, $i^*_b$, $i^*_c$ for the instantaneous, for example low-pass filtered, phase currents $i_a$, $i_b$, $i_c$, as input to selector element 81 shown in FIG. 3. As explained above, the phase currents $i_a$, $i_b$, $i_c$ are indirectly controlled, i.e., they are the result of the controlling of the inductor currents $i_{Lx}$, $i_{Ly}$, $i_{Lz}$ (shown in FIG. 2D) and the operation of the input stage 11. The set-points for the inductor currents ($i^*_{Lx}$, $i^*_{Ly}$, $i^*_{Lz}$) are derived from set-values $i^*_a$, $i^*_b$, $i^*_c$ by selector element 81 based on the measured phase voltages.

Figure 4A:
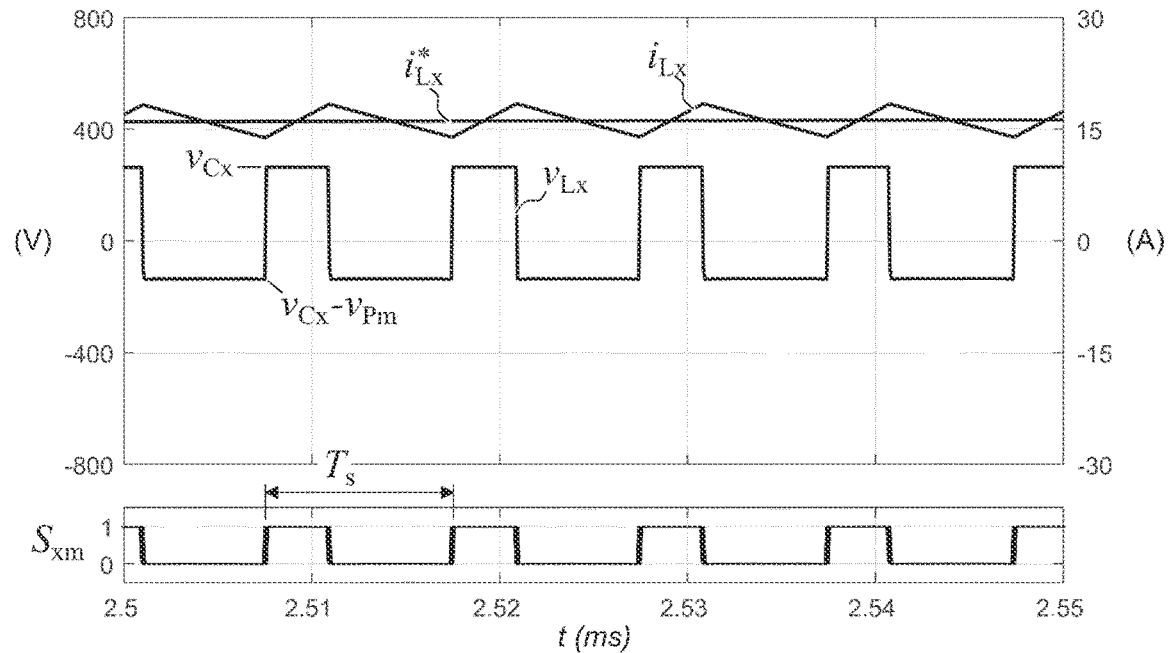
FIG. 4A, 4B, 4C show diagrams with voltages, currents and switching states within five consecutive switching cycles of the boost (upper and lower) and buck-boost bridge legs of the electrical converter, and illustrates the PWM modulation of these bridge legs according to an embodiment of the present disclosure.
Figure 4B:
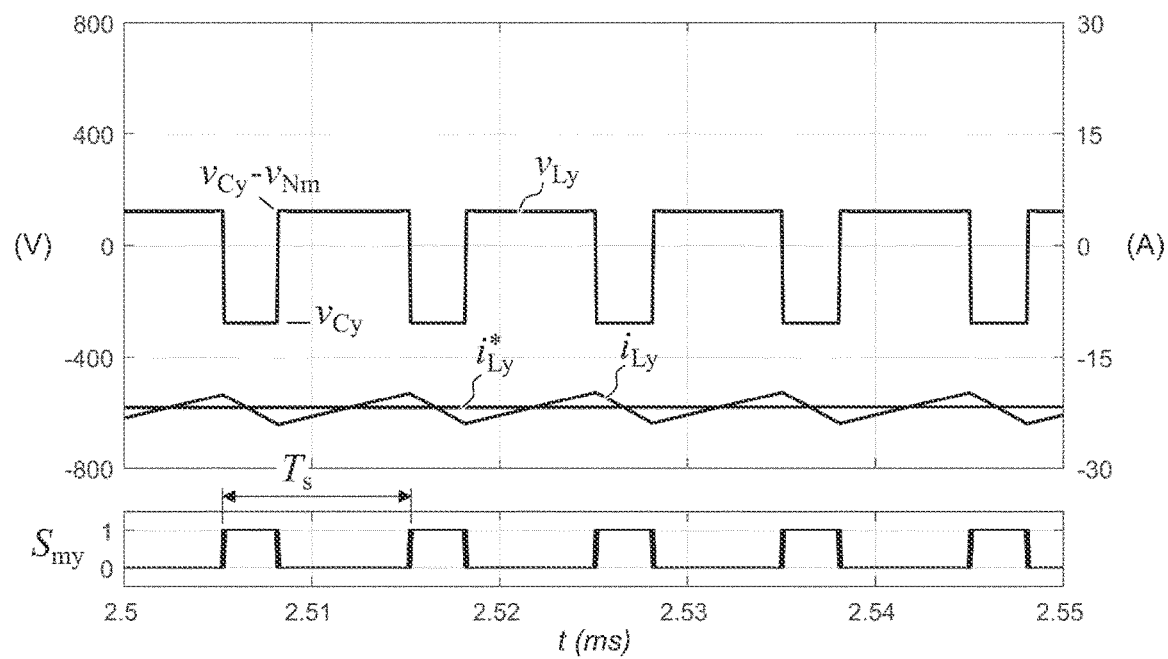
Figure 4C:
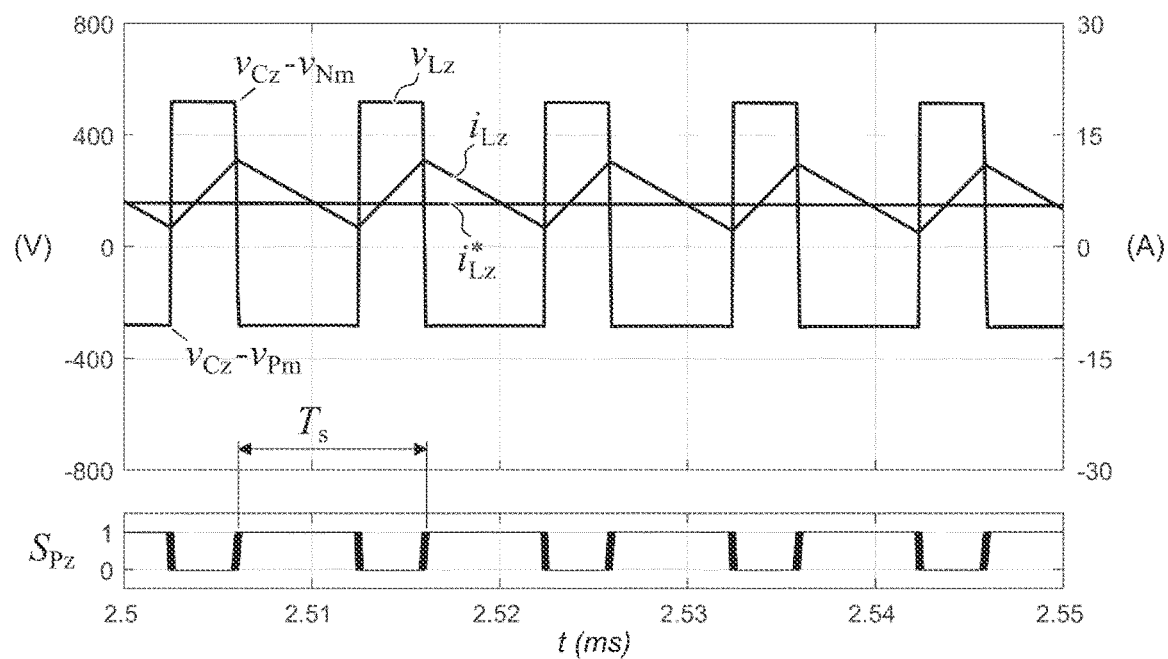

FIGS. 4A-4C show diagrams within five consecutive switching cycles (i.e., each having a switching period $T_s$ equal to $1/f_s$, with $f_s$ the switching frequency) of the bridge legs of the electrical converter 100, for a time interval around $\omega t=45°$ which lies within the sector of the three-phase AC input voltage where $0 \le \omega t \le 60°$ (see FIG. 2). Within this sector, the selector switches and diodes of the input stage 11 are in the following switching states:

Switch $S_{aza}=0$ (off), diode $D_{ax}=1$ (conducting), diode $D_{ya}=0$ (blocking); phase connection a is connected with node x;

Switch $S_{bzb}=0$ (off), diode $D_{bx}=0$ (blocking), diode $D_{yb}=1$ (conducting); phase connection b is connected with node y;

Switch $S_{czc}=1$ (on), diode $D_{cx}=0$ (blocking), diode $D_{yc}=0$ (blocking); phase connection c is connected with node z;

The diagrams of FIGS. 4A-4C show voltages, currents, and switching signals on a milliseconds time axis. FIG. 4A corresponds with the operation of the upper boost circuit, showing the corresponding inductor current $i_{Lx}$ (and the set-value $i^*_{Lx}$ of this current), the inductor voltage $v_{Lx}$, and the control signal $S_{xm}$ of the switch of the PWM-modulated upper boost bridge leg 19. FIG. 4B corresponds with the operation of the lower boost circuit, showing the corresponding inductor current $i_{Ly}$ (and the set-value $i^*_{Ly}$ of this current), the inductor voltage $v_{Ly}$, and the control signal $S_{my}$ of the switch of the PWM-modulated lower boost bridge leg 20. FIG. 4C corresponds with the operation of the middle buck-boost circuit, showing the corresponding inductor current $i_{Lz}$ (and the set-value $i^*_{Lz}$ of this current), the inductor voltage $v_{Lz}$, and the control signal $S_{Pz}$ of the upper switch of the PWM-modulated bridge leg 14. Note that the control signal $S_{zN}$ of the lower switch of the PWM-modulated bridge leg 14 is the complement of the control signal $S_{Pz}$.

In order to minimize the Total Harmonic Distortion (THD) of the AC input current of the electrical converter, the high-frequency ripple of phase currents $i_a$, $i_b$, $i_c$ is advantageously minimized.

An advantage of the electrical converter 100 is that the half-switching-period volt-seconds product/area of the upper boost inductor and of the lower boost inductor are smaller than the volt-seconds products/areas of the boost inductors of a conventional six-switch boost-type PFC rectifier. This is because the voltages applied to these inductors are smaller than in the case of a conventional six-switch boost-type PFC rectifier. For the middle buck-boost inductor, the applied voltages are not necessarily smaller but the value of the current flowing in the inductor is smaller than the value of the currents flowing in inductors of a conventional six-switch boost-type PFC rectifier. As a result, smaller inductors with less magnetic energy storage are feasible, resulting in a higher power-to-volume ratio of the electrical three-phase AC-to-DC converter 100 that is provided by the present disclosure.

Start-Up (Pre-Charge) Operation of the Electrical Converter

At start-up, it is important for the service life of the electrical components to gradually step up the output voltage $V_{PN}$. According to the present disclosure, a dedicated mode of operation is implemented in the controller 40. Referring to FIG. 5, switching device 23 is opened to interrupt conduction between the upper nodes of the bridge rectifier 24 and the upper intermediate node x. No current flows through inductor $L_x$. The phase selector 25 is now operated to apply at the middle intermediate node z a phase input voltage which is slightly higher than the (instantaneous) output voltage $V_{PN}$ across the output terminals P, N. By so doing, a phase current flows through inductor $L_z$ and further to the upper output terminal P due to the conduction of the (internal) anti-parallel diode $D_{zP}$ connected to switch $S_{Pz}$ between switch node t and terminal P. The current path is indicated by the arrows in FIG. 5 and hence goes from middle intermediate node z through switch node t through the anti-parallel diode $D_{zP}$ and through the capacitors $C_{Pm}$, $C_{mN}$ of the output filter 15 and back to lower intermediate node y.

It will be convenient to note that neither one of switches $S_{Pz}$ and $S_{yN}$ need to be operated and these switches may remain in the non-conductive state (open). Alternatively, switches $S_{Pz}$ and $S_{yN}$ may be actively operated by controller 40 such that $S_{Pz}$ is conducting while $S_{yN}$ is kept open, or vice versa, depending on the switching scheme that is utilized, as will be described further below. By so doing, losses are reduced compared to the case of operating exclusively through the anti-parallel diode $D_{zP}$.

Figure 6:
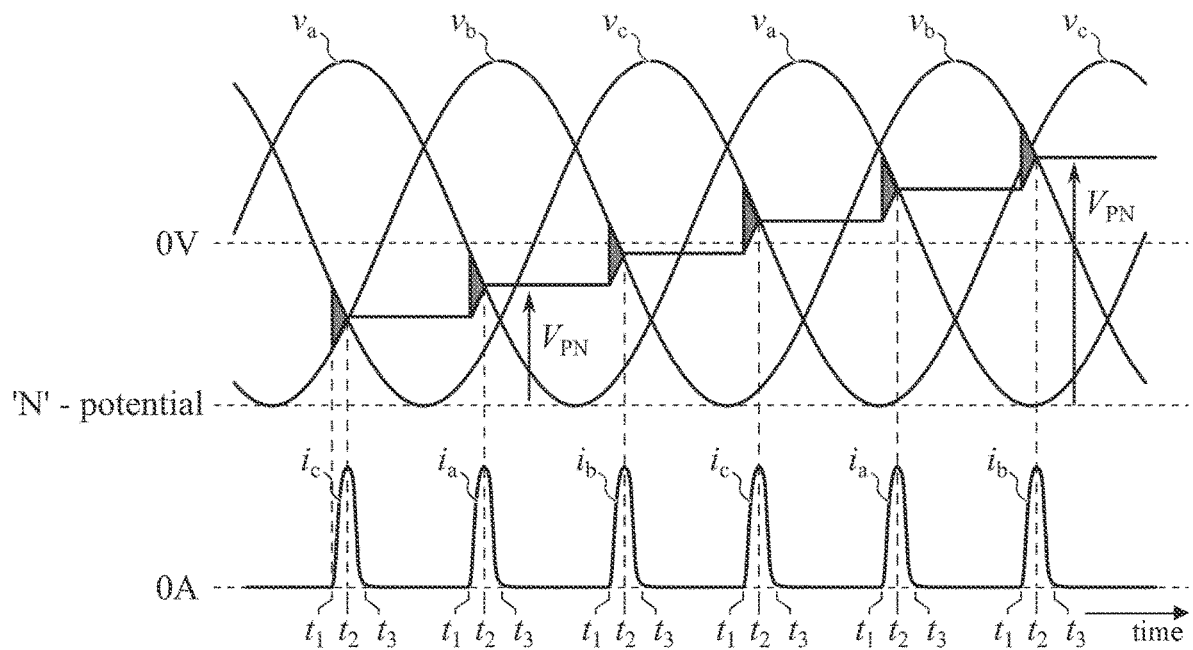
FIG. 6 represents in the upper graph the phase input voltages and stepwise pre-charging of the output voltage and in the lower graph the corresponding phase currents through the first inductor coupled to the middle intermediate node for pre-charging of the electrical converter of FIG. 1 or FIG. 5.

Referring to FIG. 6, the phase selector 25 is advantageously operated to connect a phase input A, B, C that has a falling (descending) voltage to the middle intermediate node z, when this falling voltage has a level above the instantaneous voltage potential at terminal P. The time instants $t_1$ when to connect the phase input having a falling voltage to middle intermediate node z can be suitably selected as the instant at which the phase voltage $v_a$, $v_b$, $v_c$ falls below a threshold value above the voltage potential at P ($V_{PN}$), e.g. between 5 V and 10 V above the instantaneous value of the voltage potential at P. In a second alternative, $t_1$ is selected as a predetermined time, e.g. between 1 µs and 10 µs prior to $t_2$, wherein $t_2$ is the time instant when the falling phase voltage attains/crosses the value of the voltage potential at P. The second alternative can be implemented by predicting the time instant $t_2$, e.g. based on data of the previous cycle(s) and/or based on measurements of the phase input voltages and output voltage.

Each time a switch $S_{aza}$, $S_{bzb}$, and $S_{czc}$ of the phase selector 25 is operated to connect the falling phase voltage to the middle intermediate node, a current pulse flows through the inductor $L_z$ and the output filter, thereby charging the capacitors $C_{Pm}$, $C_{mN}$ and increasing $V_{PN}$ a further step. It will be convenient to note that by appropriately selecting the time instant $t_1$ it is possible to control a magnitude of the current pulse, and thus the dynamics of the pre-charge of the output stage.

At time instant $t_2$, the falling phase voltage attains/crosses the value of the voltage potential at P corresponding to a maximum of the current pulse. Thereafter, the current magnitude through the inductor $L_z$ diminishes until becoming zero at time instant $t_3$. At $t_3$, the diode $D_{zP}$ switches to non-conducting state, and, in case switch $S_{Pz}$ is actively controlled during the pre-charge operation, controller 40 controls switch $S_{Pz}$ to switch to non-conducting state. This prevents the current to become negative and discharge the capacitors of the output filter.

Controller 40 is configured to operate switches $S_{aza}$, $S_{bzb}$, and $S_{czc}$ of the phase selector 25 to selectively connect the appropriate phase input to the middle intermediate node as described above. That is, the appropriate switch $S_{aza}$, $S_{bzb}$, and $S_{czc}$ is switched to conducting state at time instant $t_1$ and disconnected at time instant $t_3$ or thereafter. Where the phase selector switches $S_{aza}$, $S_{bzb}$, and $S_{czc}$ are formed by two semiconductor switches (FET) placed in anti-series, each having an anti-parallel diode, e.g. to obtain current-bidirectionality, it is possible to operate only one of the two FET-switches, while the other one is conducting through the anti-parallel diode. By so doing, the respective anti-parallel diode automatically turns to non-conducting state when the current becomes negative. As a result, switching of $S_{Pz}$ at $t_3$ becomes less critical. The electrical converter advantageously comprises voltage measurement sensors for measuring the phase voltages at the input terminals A, B, C and which are operably coupled to the controller 40 for using the sensed voltage levels when selecting the time instants $t_1$.

Figure 7:
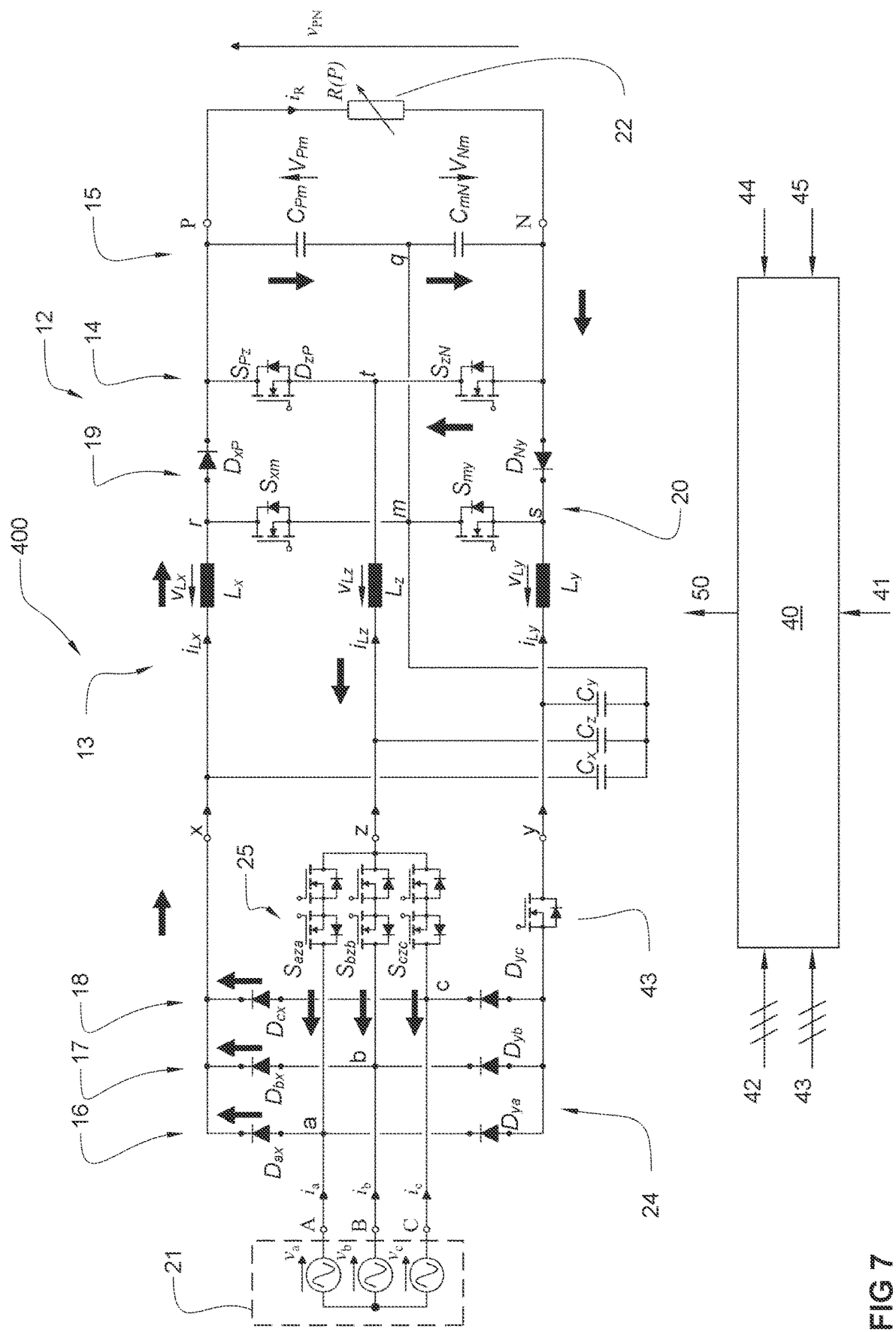
FIG. 7 schematically shows an alternative electrical converter according to an embodiment of the present disclosure.

An alternative embodiment for the start-up operation according to the present disclosure is now described in relation to FIG. 7, presenting electrical converter 400 which differs from electrical converter 100 or 200 in the position of the switch 23. Switch 23 between the upper nodes of the rectifier bridges 16, 17, 18 and the upper intermediate node x is dispensed with and replaced by switch 43 between the lower nodes of the rectifier bridges 16, 17, 18 and the lower intermediate node y. Such an arrangement allows to obtain a stepwise pre-charging of the DC bus voltage $V_{PN}$ through a reverse current flow scheme, as indicated by the arrows in FIG. 7.

Figure 8:
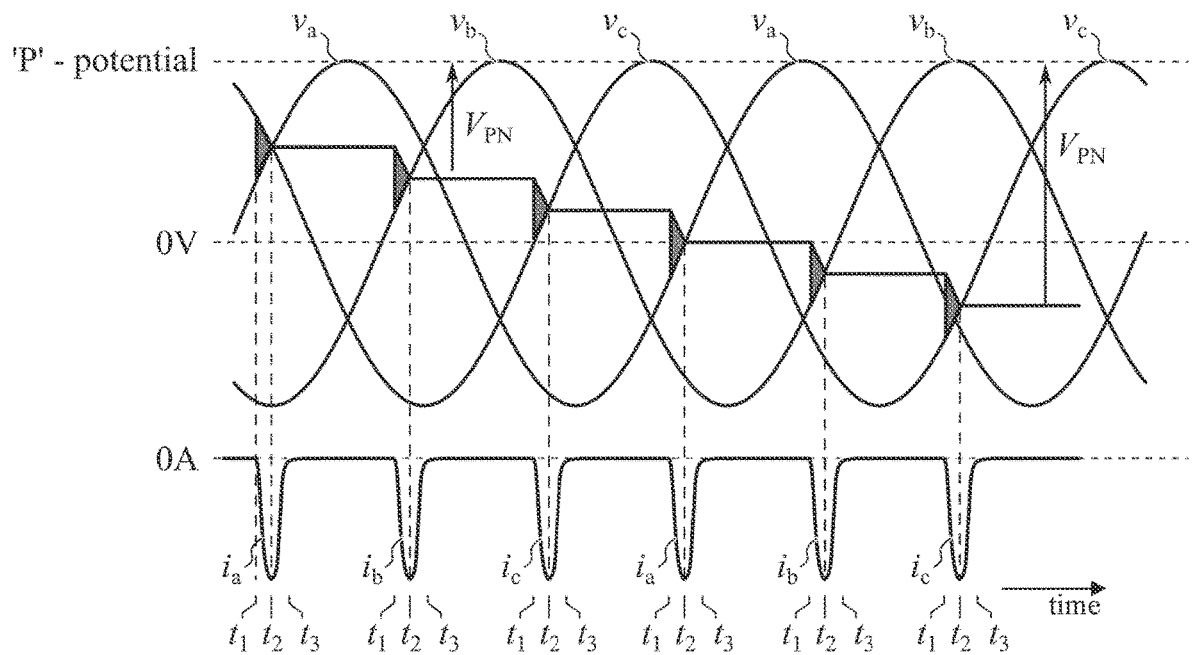
FIG. 8 represents in the upper graph the phase input voltages and stepwise pre-charging of the output voltage and in the lower graph the corresponding phase currents through the first inductor coupled to the middle intermediate node for pre-charging of the electrical converter of FIG. 7.

During start-up mode of operation, the controller 40 operates switch 43 (or switch 23 in case of FIG. 1) to be in open (non-conducting) state. Rectifier bridge 24 ensures that the highest phase voltage at the input terminals A, B, C is applied to the upper intermediate node x, resulting in the output node P to be at a high potential. Controller 40 then operates the switches of the phase selector 25 to allow for a return current path now that the lower rectifier bridge switches $D_{ya}$, $D_{yb}$, $D_{yc}$ are disconnected from the lower intermediate nodes. By so doing, an electric current can be made to flow through the output filter 15 as indicated in FIG. 8 charging the capacitors $C_{Pm}$ and $C_{mN}$. The current flow is hence from the upper intermediate node through node r and $D_{xP}$, to the output filter 15 and through the (anti-parallel diode of) lower switch $S_{zN}$ to switch node t and back to middle intermediate node z, from where the current is delivered back to the input terminals by appropriate switching of phase selector 25. During this operation, switch $S_{Pz}$ of the buck-boost circuit is left in open state (non-conducting) and switch $S_{zN}$ can be in open or closed state. If left open, the current path will flow through the anti-parallel diode coupled to $S_{zN}$.

An advantageous switching scheme of the switches of phase selector 25 of converter 400 is graphically shown in FIG. 8. The phase selector 25 is advantageously operated to connect a phase input A, B, C that has a rising (increasing) voltage to the middle intermediate node z, when this rising voltage has a level below the instantaneous voltage potential at terminal N. The time instants $t_1$ when to connect the phase input having a rising voltage to middle intermediate node z can be suitably selected as the instant at which the phase voltage $v_a$, $v_b$, $v_c$ rises above a threshold value below the instantaneous voltage potential at N, e.g. between 5 V and 10 V below the instantaneous potential at N. In a second alternative, $t_1$ is selected as a predetermined time, e.g. between 1 µs and 10 µs prior to $t_2$, wherein $t_2$ is the time instant when the rising phase voltage attains/crosses the value of the voltage potential at N. The second alternative can be implemented by predicting the time instant $t_2$, e.g. based on data of the previous cycle(s) and/or based on measurements of the phase input voltages and output voltage. At time instant $t_3$, the current becomes zero again and the anti-parallel diode coupled to $S_{zN}$ switches to non-conducting state. If $S_{zN}$ is actively switched, it is turned off at $t_3$. Also, starting from $t_3$, the phase selector switch that is in conducting state during $t_1$-$t_3$ can be switched to non-conducting state. Where the phase selector switches $S_{aza}$, $S_{bzb}$, and $S_{czc}$ are formed by two semiconductor switches (FET) placed in anti-series, each having an anti-parallel diode, e.g. to obtain current-bidirectionality, it is possible to operate only one of the two FET-switches, while the other one is conducting through the anti-parallel diode. By so doing, the respective anti-parallel diode automatically turns to non-conducting state when the current becomes negative. As a result, switching of $S_{zN}$ at $t_3$ becomes less critical.

Figure 9:
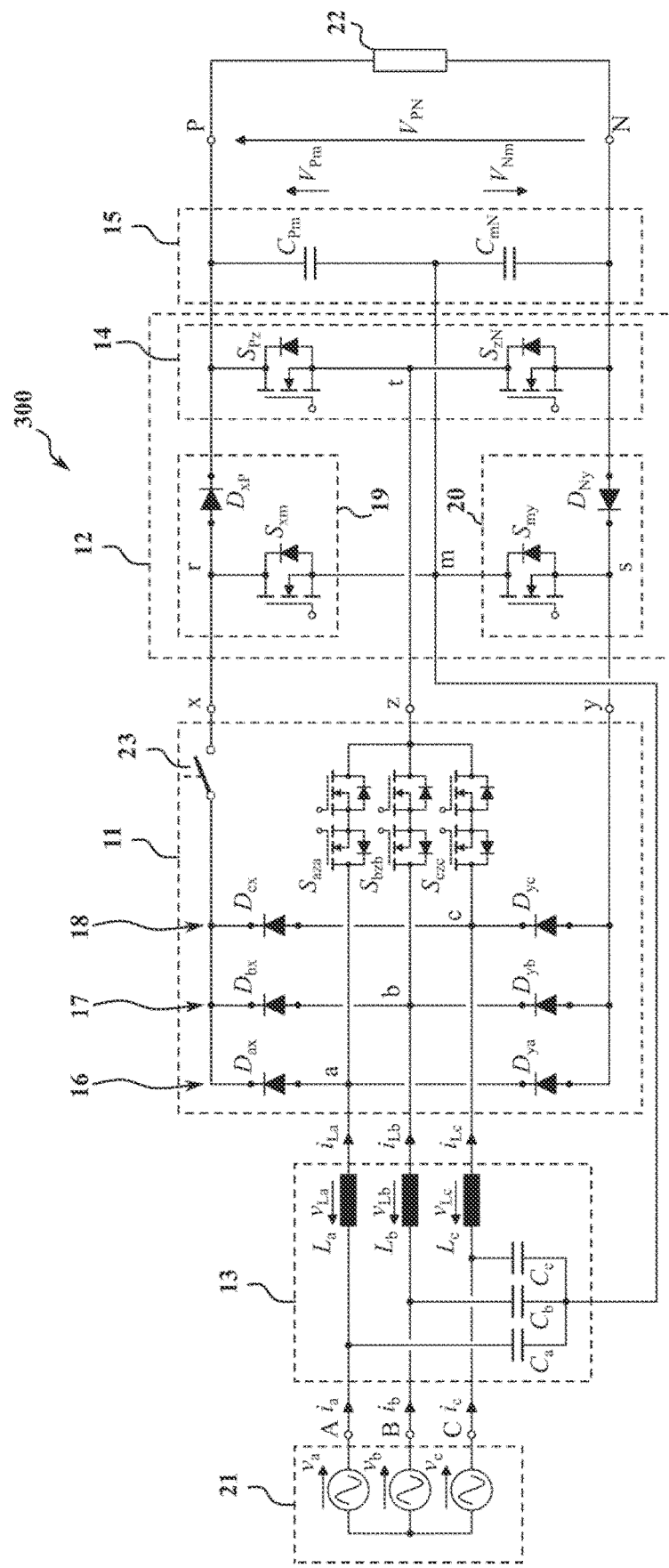
FIG. 9 schematically shows an electrical converter that is unidirectional, and that has an input filter that is placed before instead of after the phase selector according to an embodiment of the present disclosure.

In FIG. 9, an electrical converter 300 is shown which differs from converter 100 in that the input filter 13 is placed before (instead of after) input stage 11, i.e. the input filter 13 is connected between the phase input terminals A, B, C and the input stage 11. The input stage 11 connects the phase input terminals A, B, C to the intermediate nodes x, y, z via the corresponding inductor $L_a$, $L_b$, $L_c$ of the input filter 13. Capacitors $C_a$, $C_b$, $C_c$ are arranged between the phase input terminals and the inductors. The capacitors are connected in a star configuration, advantageously with the star point connected to a midpoint of the output filter 15, just like in the previous examples. Alternatively, the capacitors $C_a$, $C_b$, $C_c$ can be arranged in a delta configuration across the three phase input lines. It will be convenient to note that in the example of FIG. 9, the voltage signal at the three intermediate nodes x, y, z is somewhat different as compared to the previous examples (FIGS. 1, 5 and 7), since the voltages at switch nodes r, s and t are identical to the voltages at the intermediate nodes x, y, z. As a result, high frequency currents will be flowing through the input stage 11, whereas in the previous examples (FIGS. 1, 5 and FIG. 7) the high frequency currents only occur in the output converter stage downstream of the input filter 13.

In either electrical converters 100, 300 and 400, diodes may be replaced by actively switchable semiconductor devices to allow for bidirectional power flow of the electrical converter.

In either electrical converters 100-400, the HF capacitors $C_x$, $C_y$, $C_Z$ (or $C_a$, $C_b$, $C_c$ in case of FIG. 9) are connected in a star configuration. The voltage in the star point connection can be controlled by controlling the voltage at the common node m.

Referring again to FIG. 1, one advantage of aspects of the present disclosure, is that no inrush current limiter, e.g. a resistor, need be provided in parallel with switch 23. This reduces losses, prevents bulkiness, and increases service life.

FIG. 10A-D show different variants of the input stage 11, which may be used in the electrical converters 100-400 described above.

Figure 10A:
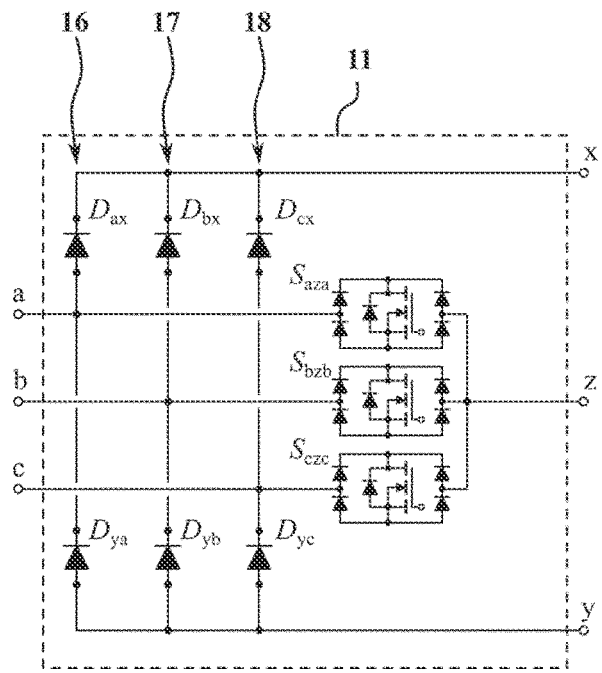
FIGS. 10A-D show different variants of the phase selector that can be used in electrical converters of the present disclosure.
Figure 10B:
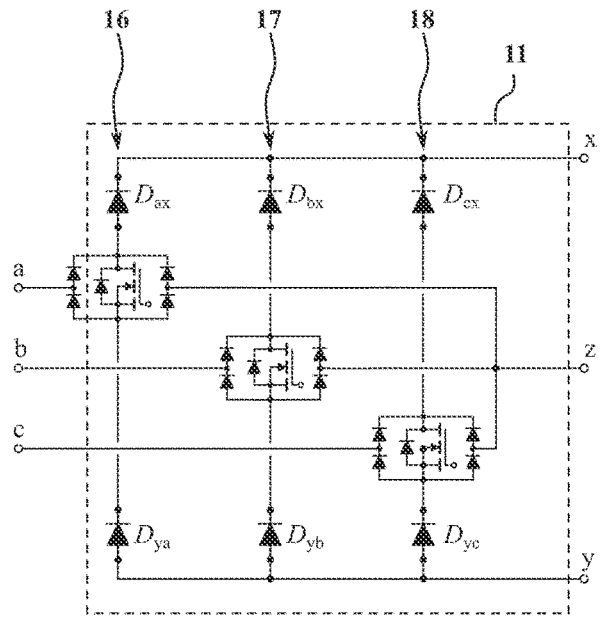
Figure 10C:
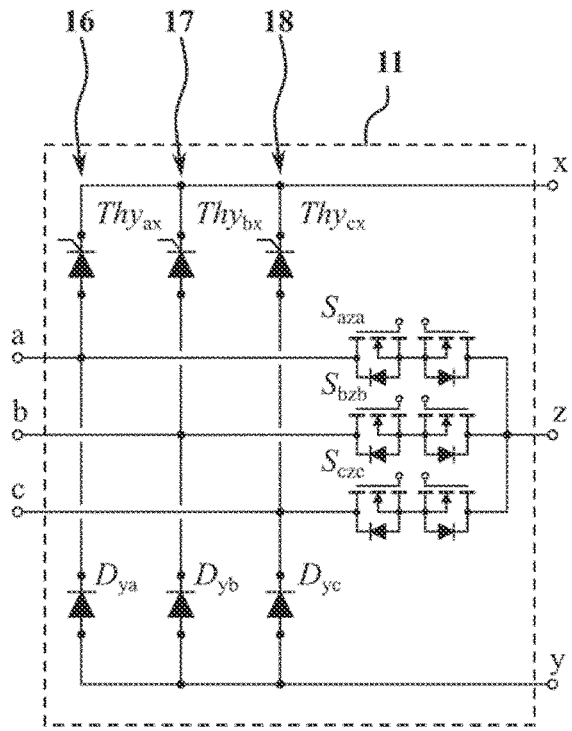
Figure 10D:
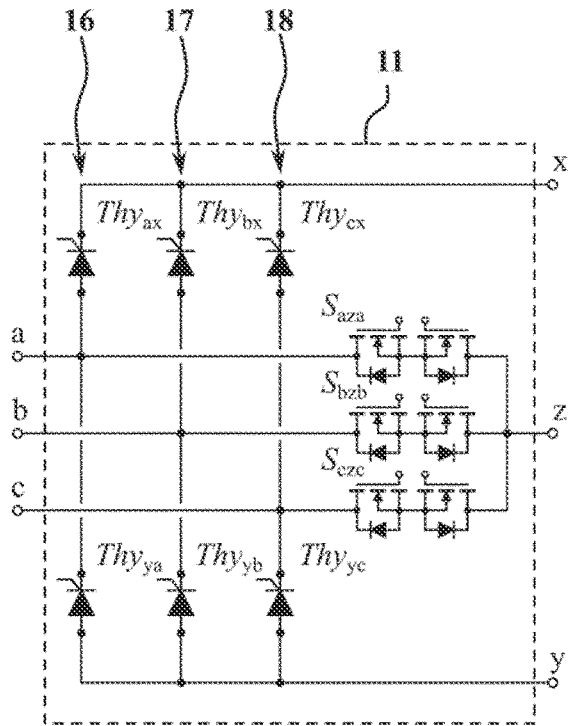

Referring to FIG. 100 and FIG. 10D, it will be convenient to note that in the converter stages of, the functionality of the switch 23 can be taken up by active (bidirectional) switches in the bridge legs 16-18. Thyristors $Thy_{ax}$, $Thy_{bx}$, $Thy_{cx}$ in the upper bridge legs input stage 11 in FIG. 100 and alternatively thyristors $Thy_{ya}$, $Thy_{yb}$, $Thy_{yc}$ in the input stage of FIG. 10D can be controlled by controller 40 during the second mode of operation to keep the upper intermediate node x or the lower intermediate node y disconnected from all three phase terminals A, B, C, thereby obtaining switch 23, and avoiding the need for an additional hardware switch 23 as in FIG. 1. In a further alternative, a (current-)bidirectional active switch can be used instead of Thyristors $Thy_{ax}$, $Thy_{bx}$, $Thy_{cx}$ and/or thyristors $Thy_{ya}$, $Thy_{yb}$, $Thy_{yc}$, such as a pair of anti-series connected MOSFETs, each having an anti-parallel diode.

Figure 11:
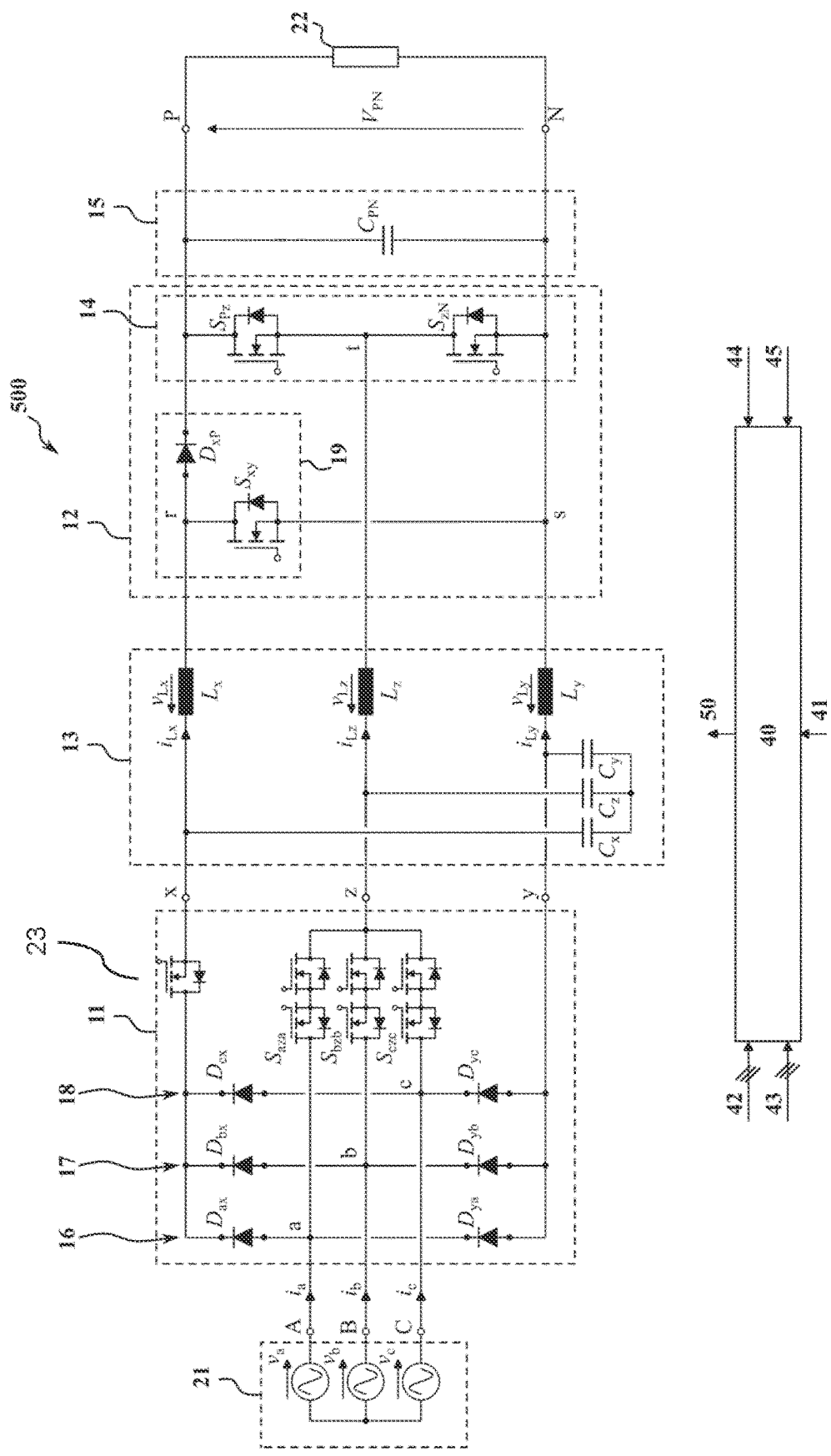
FIG. 11 represents a variant of the electrical converter according to the present disclosure, with a simplified boost circuit in the output converter stage.

Referring to FIG. 11, a variant of the electrical converter 100 of FIG. 1 is shown. Electrical converter 500 differs from the converter 100 of FIG. 1 in that a single boost circuit 19, rather than two stacked boost circuits 19, 20 are used. Boost circuit 19 now comprises switch $S_{xy}$ connected between the nodes r and s. The output filter 15 can comprise a single capacitor $C_{PN}$ with no middle node. Other variants are possible, wherein the boost circuit 19 is omitted as well.

Figure 12:
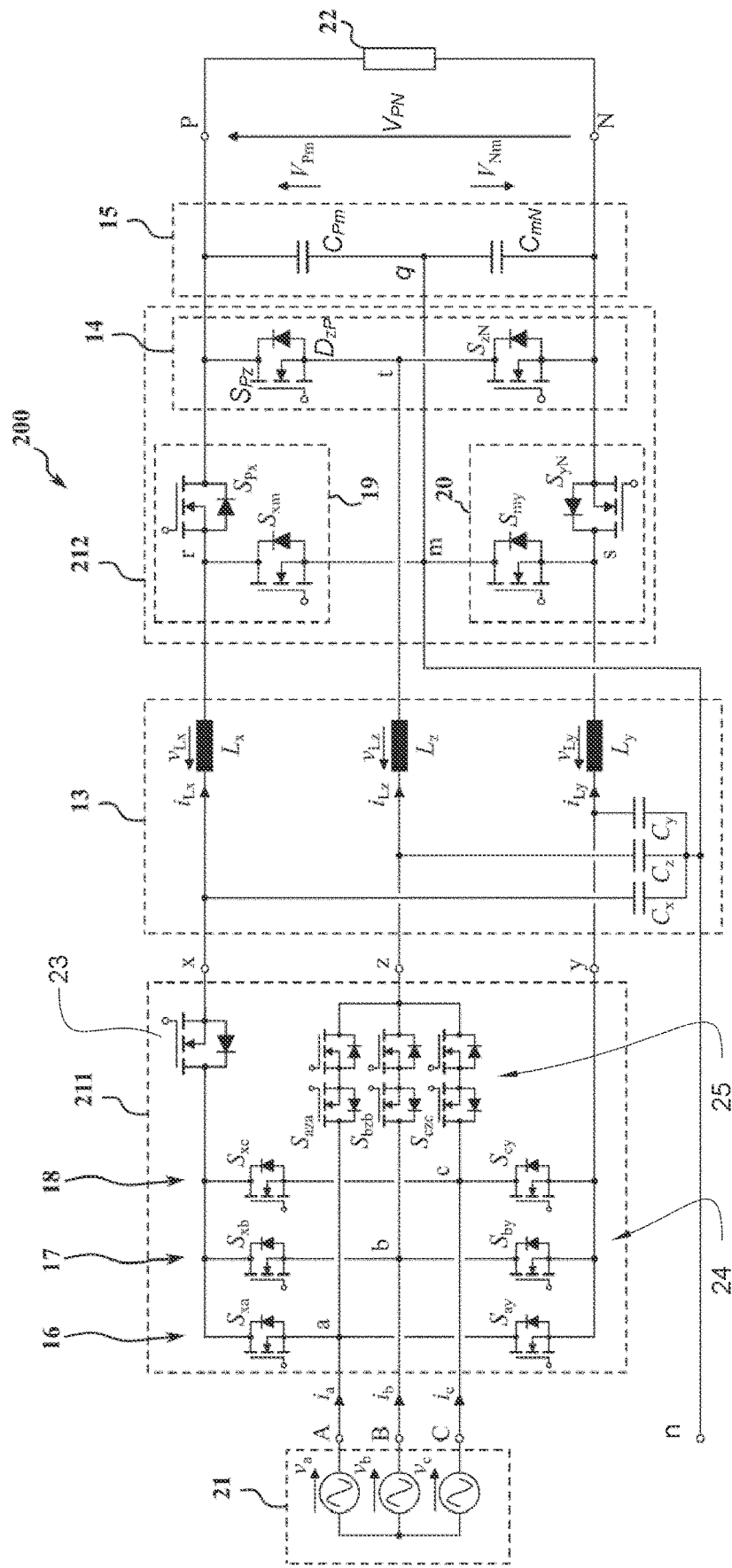
FIG. 12 represents an electrical converter according to aspects of the present disclosure that comprises a connection terminal for connecting to the neutral conductor of the grid (fourth phase).

Referring to FIG. 12, the electrical converter 100 (and which may alternatively be the electrical converter 200, 300 or 400) can comprise a connection terminal n for connecting the neutral conductor of the three-phase AC grid. In some applications, such as for example the charging of electric vehicles, it is often required that the amplitude of the sinusoidal current drawn from each phase of the three-phase grid can be independently controlled in order to be able to decrease the loading of a certain phase such that other consumer devices are still able to draw power from that particular phase during the charging of the vehicle's battery while not overloading the phase. In this case, the connection terminal n is advantageously connected to the neutral conductor of the three-phase grid, allowing a return current substantially equal to the sum of the three phase currents to flow back to the neutral conductor of the grid. In an advantageous aspect, the three phase currents can be fully independently controlled by providing a common node connected to the neutral conductor of the input.

The neutral connection terminal n is advantageously connected to the star-point of the AC capacitors $C_x$, $C_y$, $C_Z$ and to the common node m of the stacked boost bridges 19, 20 (and thus also to the midpoint of the output filter 15). This results in a fully symmetrical converter structure. In this case, the voltage at the star-point and at the common node is equal to the voltage of the neutral conductor of the grid. A connection between common node m and midpoint q of the output filter 15 can or cannot be present.

It will be convenient to note that electrical converters according to the present disclosure can be contemplated comprising both switch 23 between the upper nodes of the bridge rectifier and the upper intermediate node x and switch 43 between the lower nodes of the bridge rectifier and the lower intermediate node y. During pre-charge operation, the controller may allow to alternate between pre-charging the DC bus based by opening switch 23 (switch 43 closed) and pre-charging the DC bus by opening switch 43 (switch 23 closed).

Figure 13:
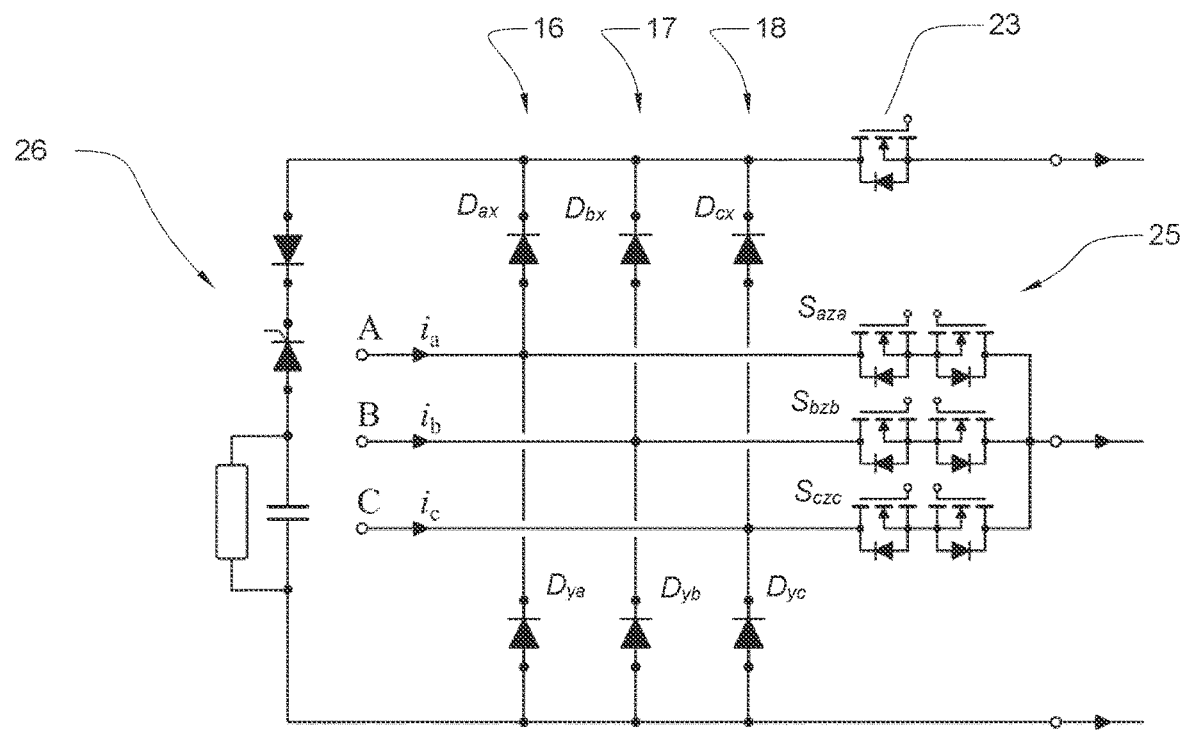
FIG. 13 represents a variant of the input stage according to the present disclosure comprising a buffer for capturing energy of input filter inductors at turn off of the electrical converter.

Referring to FIG. 13, in case the switching device 23 cannot be kept in conductive state (closed) when the converter is turned off, it may be convenient to add a buffer circuit 26 across the three phase bridge rectifier 24. The buffer circuit 26 comprises a capacitor possibly in parallel with a resistor and acts to capture (and dissipate) energy stored in the inductances of any input filter and of the power mains. This avoids damage when the converter would need to shut down, for example when it would go to error mode due to an overvoltage or overtemperature. The buffer circuit can comprise a capacitor in series with a Zener diode connected between the upper and lower nodes of the bridge rectifier 24. A diode can additionally be placed in anti-series with the Zener diode to reduce reactive power consumption of the capacitor during normal operation. Alternatively a surge arrestor can be provided instead of the Zener diode and the capacitor.

Figure 14:
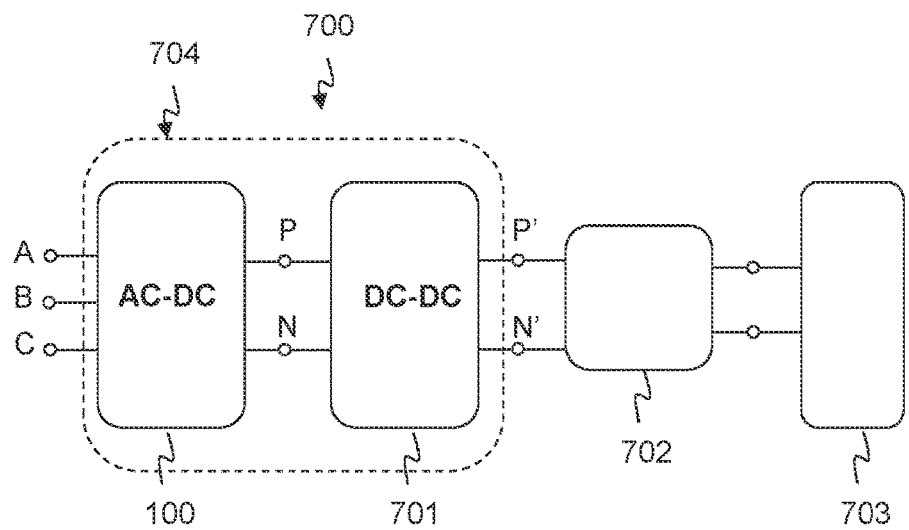
FIG. 14 represents a battery charging system according to aspects of the present disclosure.

Referring to FIG. 14, a battery charging system 700 comprises a power supply unit 704. The power supply unit 704 is coupled to an interface 702, e.g. comprising a switch device, which allows to connect the power supply unit 704 to a battery 703. The power supply unit 704 comprises any one of the electrical converters 100, 200, 400 as described hereinabove coupled to a DC-DC converter 701. DC-DC converter is coupled between the DC terminals P, N of the electrical converter 100 and the DC terminals P', N' of the power supply 704. The DC-DC converter 701 can be an isolated DC-DC converter. The DC-DC converter can comprise a transformer effecting galvanic isolation, particularly in case of wired power transfer between power supply unit 704 and the battery 703. The DC-DC converter can comprise a pair of coils which are inductively coupled through air, such as in case of wireless power transfer. In some cases, the interface 702 can comprise a plug and socket, e.g. in wired power transfer. Alternatively, the plug and socket can be provided at the input (e.g., at nodes A, B, C).

The invention claimed is:

1. An electrical converter for converting an AC signal having three phase voltages into a DC signal, the electrical converter comprising:
   three phase terminals (A, B, C), a first DC terminal (P), and a second DC terminal (N);
   a first converter stage comprising a three-phase bridge rectifier connecting the three phase terminals to an upper intermediate node (x) and a lower intermediate node (y), and a phase selector comprising first active switches ($S_{aza}$, $S_{bzb}$, $S_{czc}$) connecting the three phase terminals to a middle intermediate node (z);
   an output filter comprising at least one capacitor ($C_{Pm}$, $C_{mN}$) connected across the first and second DC terminals (P, N);
   a second converter stage arranged between the first converter stage and the output filter, wherein the second converter stage comprises a switch node (t) and a pair of second switches ($S_{Pz}$, $S_{zN}$) connecting the switch node (t) to a respective one of the first and second DC terminals (P, N), wherein the middle intermediate node (z) is connected to the switch node (t); and
   a controller implemented with a first mode of operation configured to convert the AC signal into the DC signal;
   wherein the controller is implemented with a second mode of operation, in which the electrical converter is configured to disconnect the upper intermediate node (x) and/or the lower intermediate node (y) from all the phase terminals (A, B, C), and in which the controller is configured to control switching of the first switches ($S_{aza}$, $S_{bzb}$, $S_{czc}$) while keeping the upper intermediate node (x) or the lower intermediate node (y) disconnected from all the phase terminals (A, B, C), such that a current is allowed to flow between the middle intermediate node (z) and the output filter (15), allowing for stepwise increasing a voltage across the output terminals (P, N) during start-up.

2. The electrical converter of claim 1, wherein in the second mode of operation, the controller is configured to control the first switches ($S_{aza}$, $S_{bzb}$, $S_{czc}$) so as to:
   apply one of the three phase voltages having a descending voltage higher than a voltage at the first DC terminal (P) to the middle intermediate node (z), or
   apply one of the three phase voltages having a rising voltage lower than a voltage at the second DC terminal (N) to the middle intermediate node (z).

3. The electrical converter of claim 1, comprising at least one third switch configured to interrupt an electrical connection between one of:
   the three-phase bridge rectifier and the upper intermediate node (x),
   the three-phase bridge rectifier and the lower intermediate node (y), and
   the three-phase bridge rectifier and both the upper and lower intermediate nodes;
   wherein the third switch is closed in the first mode of operation, and wherein the third switch is kept open in the second mode of operation.

4. The electrical converter of claim 3, wherein the at least one third switch is connected between one or both of:
   an upper node of the three-phase bridge rectifier and the upper intermediate node (x), and
   a lower node of the three-phase bridge rectifier and the lower intermediate node (y).

5. The electrical converter of claim 3, wherein the third switch is a semiconductor switch.

6. The electrical converter of claim 3, wherein the third switch is a relay.

7. The electrical converter of claim 1, wherein in the first mode of operation, the controller is configured to control switching of the first switches ($S_{aza}$, $S_{bzb}$, $S_{czc}$) according to a switching pattern in which the phase terminal having a smallest instantaneous absolute voltage value of the three phase voltages is connected to the middle intermediate node (z).

8. The electrical converter of claim 1, wherein the second converter stage comprises a current injection circuit, wherein the current injection circuit comprises the second switches ($S_{Pz}$, $S_{zN}$), and wherein the second switches are active switches.

9. The electrical converter of claim 1, wherein the second converter stage further comprises a boost circuit configured to convert between a second DC signal at a fourth intermediate node (r) and a fifth intermediate node(s) and a third DC signal at the first and second DC terminals (P, N), wherein the electrical converter comprises a link connecting the upper intermediate node (x) to the fourth intermediate node (r) and the lower intermediate node (y) to the fifth intermediate node(s).

10. The electrical converter of claim 9, wherein the boost circuit comprises a first boost circuit and a second boost circuit stacked between the first DC terminal (P) and the second DC terminal (N), wherein the first and second boost circuits comprise a common node (m), and wherein each of the first and second boost circuits comprise at least one fourth switch ($S_{xm}$, $S_{my}$).

11. The electrical converter of claim 10, wherein the output filter comprises a midpoint node (q) between the first and second DC terminals (P, N), wherein the common node (m) is connected to the midpoint node (q).

12. The electrical converter of claim 9, wherein the link comprises an input filter.

13. The electrical converter of claim 1, further comprising an inductor ($L_z$) configured to filter a current flowing through the middle intermediate node (z) when in the second mode of operation.

14. The electrical converter of claim 13, wherein the inductor is connected between the middle intermediate node (z) and the switch node (t).

15. The electrical converter of claim 1, further comprising a buffer circuit connected parallel to the three-phase bridge rectifier, wherein the buffer circuit comprises a buffer capacitor.

16. Battery A battery charging system comprising a power supply unit, the power supply unit comprising the electrical converter of claim 1.

17. A magnetic resonance imaging apparatus comprising a gradient amplifier, the gradient amplifier comprising a power supply unit, the power supply unit comprising the electrical converter of claim 1.

18. An electric motor drive system comprising a power supply unit, the power supply unit comprising the electrical converter of claim 1.

19. A method of converting a three phase AC input into a DC output, the method comprising:

providing the electrical converter of claim 1; and pre-charging the electrical converter by disconnecting the upper intermediate node (x) and/or the lower intermediate node (y) from all the phase terminals (A, B, C) and controlling the first switches ($S_{aza}$, $S_{pzb}$, $S_{czc}$) to provide a current flow between the middle intermediate node (z) and the output filter while keeping the upper intermediate node (x) and/or the lower intermediate node (y) disconnected from all the phase terminals (A, B, C) so as to stepwise increase a voltage across the first and second DC terminals (P, N) during start-up.

20. The method of claim 19, wherein the pre-charging comprises one or a combination of: applying one of the three phase voltages having a descending voltage higher than a voltage at the first DC terminal (P) to the middle intermediate node (z), and applying one of the three phase voltages having a rising voltage lower than a voltage at the second DC terminal (N) to the middle intermediate node (z).

* * * * *

UNITED STATES PATENT AND TRADEMARK OFFICE
CERTIFICATE OF CORRECTION

PATENT NO. : 12,184,200 B2
APPLICATION NO. : 17/997728
DATED : December 31, 2024
INVENTOR(S) : Jordi Everts and Noud Slaats Page 1 of 1

It is certified that error appears in the above-identified patent and that said Letters Patent is hereby corrected as shown below:

In the Claims

Claim 16, Column 18, Line 58, the text "Battery A battery charging system comprising" should read --A battery charging system comprising--.

Signed and Sealed this
Eleventh Day of February, 2025

Coke Morgan Stewart
*Acting Director of the United States Patent and Trademark Office*